United States Patent [19]
Miyata et al.

[11] Patent Number: 5,462,492
[45] Date of Patent: Oct. 31, 1995

[54] CONTINUOUS SPEED-SHIFTING DEVICE

[75] Inventors: Hirofumi Miyata; Yoshihiro Akahoshi; Eiichiro Ikeda; Yutaka Furukawa, all +of Kobe, Japan

[73] Assignee: Bando Chemical Industries, Ltd., Kobe, Japan

[21] Appl. No.: 318,552

[22] Filed: Oct. 5, 1994

[30] Foreign Application Priority Data

| Oct. 6, 1993 | [JP] | Japan | 5-250835 |
| Oct. 6, 1993 | [JP] | Japan | 5-250842 |
| Oct. 6, 1993 | [JP] | Japan | 5-250846 |
| Oct. 6, 1993 | [JP] | Japan | 5-250847 |
| Oct. 6, 1993 | [JP] | Japan | 5-250864 |
| Oct. 6, 1993 | [JP] | Japan | 5-250865 |

[51] Int. Cl.$^6$ ............................... F16H 63/00
[52] U.S. Cl. ............................... 474/38; 474/1
[58] Field of Search ............................... 474/1–3, 7, 8, 474/11, 12, 37, 38, 69–72

[56] References Cited

U.S. PATENT DOCUMENTS

| 3,670,594 | 6/1972 | Roper | 474/1 X |
| 4,301,902 | 11/1981 | Gatsos et al. | 474/1 X |
| 5,176,579 | 1/1993 | Ohsono et al. | 474/18 X |
| 5,410,923 | 5/1995 | Yamashita et al. | 474/38 X |

*Primary Examiner*—Michael Powell Buiz
*Attorney, Agent, or Firm*—Sixbey, Friedman, Leedom & Ferguson; Gerald J. Ferguson, Jr.

[57] ABSTRACT

In a continuous speed-shifting device in which a variable speed pulley mechanism and a planetary gear mechanism are combined with each other, respective cam mechanisms are provided on respective back sides of movable sheaves of variable speed pulleys of the variable speed pulley mechanism so as to move the sheaves toward and away from fixed sheaves of the variable speed pulleys, a linkage mechanism for linking both the cam mechanisms to each other is provided so that the diameters at which the belt is wound around both the pulleys are varied in a reverse direction to each other, the variable speed pulley mechanism is shifted in speed in such a manner that an output gear for supporting a pinion of the planetary gear mechanism is switched among a normal rotation state, a neutral state and a reverse rotation states with respect to a rotary shaft, the output gear is adjustable to the neutral state by a balance between the thrusts to the belt by both the pulleys, and the variable speed pulley mechanism serves as a circulating power channel at the forward state of the vehicle at which the use frequency is higher. Thus, the frequency with which large driving power is applied to the belt of the pulley mechanism is decreased so that the belt load is reduced, thereby readily obtaining the normal and reverse rotation states without a normal and reverse rotation mechanism.

17 Claims, 13 Drawing Sheets

CONTINUOUS SPEED-SHIFTING DEVICE

BACKGROUND OF THE INVENTION

This invention relates to a continuous speed-shifting device in which a variable speed pulley mechanism and a differential gear mechanism are combined.

As an example of a belt type continuous speed-shifting device, there has been known the following device. This device is composed of a variable speed pulley mechanism which has variable speed pulleys and a V-belt wound between the variable speed pulleys. Each of the variable speed pulleys is composed of a fixed sheave axially non-slidably mounted on each of a pair of rotary shafts arranged in parallel with each other so as to rotate together with each of the rotary shafts, and a movable sheave axially slidably supported on each of the rotary shafts so as to rotate together with each of the rotary shafts. The fixed sheave and the movable sheave are opposed to each other so that a V-shaped belt groove is formed therebetween. The speed ratio between both rotary shafts is changed by varying an effective radius with respect to the V-belt by moving each movable sheave in its axial direction.

Meanwhile, there is proposed a continuous speed-shifting device in which the above-mentioned variable speed pulley mechanism and a planetary gear mechanism (differential gear mechanism) as a gear mechanism for speed shifting are combined, as disclosed in the Japanese Patent Application Laying Open Gazette No.62-118159.

In the above continuous speed-shifting device in which the variable speed pulley mechanism and the differential gear mechanism are combined, when an output shaft is made to rotate from its stopping state by using the differential gear mechanism, a power transmitting channel is divided into a driving power channel and a circulating power channel.

More specifically, in the closed-circuit type differential gearing, one of three gear elements of the differential gear mechanism is connected to the output shaft, and by varying the number of rotations of one of the remaining gear elements in such a manner as to regulate a speed ratio at the pulley mechanism, the rotating direction and the rotation speed are differentiated between the gear element and the remaining other gear elements, so that the rotating direction and the number of rotations of the gear element on the output side, namely, the output shaft, are determined. At this time, however, both the driving power and the circulating power are generated as motive power and output power is equal to the driving power minus the circulating power. Which of the two power transmission channels extending from an input shaft to the output shaft will become a driving power channel or a circulating power channel depends upon the number of rotations of the gear elements in the differential gear mechanism, and the gear element with the larger number of rotations becomes the driving power channel. The above number of rotations of the gear element means a circumferential speed on a pitch circle of the gear element.

In this case, in order to lessen the transmission load of the belt in the variable speed pulley mechanism, the output shaft is used in a state of rotating only in a set direction with respect to the rotation of the input shaft and at the time, the belt side of the variable speed pulley mechanism is made to be the circulating power channel on which circulating power smaller than driving power is transmitted.

When the above continuous speed-shifting device is applied for vehicles such as agricultural implements and other machines, however, since the output shaft rotates only in the set direction, there is required a normal and reverse rotation mechanism for switching the rotation of a driving wheel between normal and reverse directions in order to switch a vehicle running direction between forward and backward. This invites problems such as noise at the switching.

It is the primary object of the present invention to switch a vehicle running direction between forward and backward without providing a normal and reverse rotation mechanism individually when a continuous speed-shifting device in which a variable speed pulley mechanism and a differential gear mechanism are combined are mounted on a vehicle.

Another object of this invention is to accomplish compaction of a continuous speed-shifting device, simplification of its structure, reduce in the number of parts and cost reduction.

A further object of this invention is to simplify a structure of a torque cam mechanism.

A further object of this invention is to provide a continuous speed-shifting device having a structure so that variable speed pulleys and other elements can be maintained and inspected readily.

SUMMARY OF THE INVENTION

A continuous speed-shifting device according to claim 1 of this invention is so composed that a variable speed pulley mechanism is switchable into a driving power channel on which driving power is transmitted and that an output part is rotated in a normal direction state or a reverse direction state by switching the driving power channel between a differential gear mechanism and the variable speed pulley mechanism. At this time, in order to lessen a transmission load of a belt at the variable speed pulley mechanism, the continuous speed-shifting device is so composed that the variable speed pulley mechanism serves as a circulating power channel in higher use frequency one of both the rotating direction states of the output part.

More particularly, a continuous speed-shifting device of this invention comprises first and second rotary shafts arranged in parallel with each other, a variable speed pulley mechanism and a differential gear mechanism. The variable speed pulley mechanism speed-shiftably connects both the first and second rotary shafts and has the following construction. The variable speed pulley mechanism has a pair of variable speed pulleys in which a fixed sheave and a movable sheave are supported to respective rotary shafts so as to be opposed to each other, a belt wound between both the variable pulleys, a pair of driving mechanisms each of which is disposed on the back side of the movable sheave of each variable speed pulley and varies a diameter at which the belt is wound around the variable speed pulley by moving the movable sheave toward and away from the fixed sheave, a linkage mechanism for varying a speed ratio between both the variable speed pulleys by linking both the driving mechanisms to each other so as to vary the diameters at which the belt is wound around both the variable speed pulleys in a direction opposite to each other, a switching operation part for operating the linkage mechanism, and a tension mechanism for pressing a slack side span of the belt between both the variable speed pulleys so as to generate a tension larger than that generating in accordance with the speed ratio between the variable speed pulleys thereby generating a belt thrust.

Further, the differential gear mechanism has first, second and third gear elements connected to one another. The first gear element is connected to the first rotary shaft. The second gear element is connected to the second rotary shaft.

One of the first rotary shaft and the third gear element is an input part, while the other is an output part. The output part is shifted in speed in such a manner as to be switched into a normal rotating state, a neutral state or a reverse rotating state with respect to the input part by switching operation of the switching operation part.

Furthermore, the output part is forced so as to be shifted into the neutral state by a balance between the thrusts to the belt by both the variable speed pulleys of the variable speed pulley mechanism. In higher use frequency one of the normal rotating state and the reverse rotating state, at least one of a gear ratio of the differential gear mechanism itself and a gear ratio between the differential gear mechanism and gear elements meshed with the differential gear mechanism are set in order that the rotation speed of the first gear element connected to the first rotary shaft (circumferential speed on the pitch circle) is always higher than the rotation speed of the second gear element connected to the second rotary shaft.

In a continuous speed-shifting device according to claim 2 of this invention, the variable speed pulley mechanism is so composed that the movable sheave and the fixed sheave are oriented in reverse between both the variable speed pulleys.

Further, the driving mechanism is a cam mechanism having a cylindrical rotating cam rotatably supported on a boss part of the movable sheave of the variable speed pulley via a bearing and a fixed cam in contact with the rotating cam. One of the rotating cam and the fixed cam has a cam face formed at a surface thereof, while the other is formed into a cam follower to be in contact with the cam face. The movable sheave is moved in an axial direction by relative rotation of the rotating and fixed cams.

Furthermore, the linkage mechanism has a link for connecting the rotating cams of both the cam mechanisms to each other.

In a continuous speed-shifting device according to claim 3 of this invention, when the continuous speed-shifting device is mounted on a vehicle, the input part is connected to an engine mounted in the vehicle while the output part is connected to a driving wheel of the vehicle. The forward state in which the driving wheel is rotated so as to move forward the vehicle is higher in use frequency.

In a continuous speed-shifting device according to claim 4 of this invention, when a torque cam mechanism is provided between the boss part of the movable sheave and the rotary shaft in the variable speed pulley, the boss part of the movable sheave is integrally formed with the body part thereof. In detail, a torque cam mechanism comprises (a) a cam part formed at the boss part of the movable sheave of the variable speed pulley and having a cam face and (b) a torque pin which protrudes from the outer periphery of the rotary shaft and makes contact with the cam face of the cam part by relative rotation of the movable sheave to the rotary shaft to move the movable sheave in an axial direction. The boss part of the movable sheave at which the torque cam mechanism is provided is formed integrally with the body part of the movable sheave.

In a continuous speed-shifting device according to claim 5, the torque pin of the torque cam mechanism is composed of a pin member passing through the rotary shaft in its radial direction and supported to the rotary shaft.

In a continuous speed-shifting device of claim 6, the torque cam mechanism is provided in either of the variable speed pulleys. In detail, the cam part is formed at the boss part of the movable sheave of one of the variable speed pulleys and the cam face is formed at each of opposing side faces of the cam part so that the cam faces accord with the normal and reverse rotating states of the output part with respect to the input part, respectively.

In a continuous speed-shifting device of claim 7, the torque cam mechanism is provided at the variable speed pulley which becomes a driven side when the variable pulley mechanism becomes a circulating power channel.

In a continuous speed-shifting device of claim 8, the opposing cam faces of the cam part in claim 6 are different in lead angle from each other.

In a continuous speed-shifting device of claim 9, the differential gear mechanism is composed of a planetary gear mechanism having (a) a sun gear provided on the second rotary shaft, (b) at least one pinion meshed with the sun gear, (c) a ring gear meshed with the pinion, and (d) a transmission gear provided on the second rotary shaft and directly connected to the pinion.

In a continuous speed-shifting device of claim 10, the sun gear of the planetary gear mechanism in claim 9 is fixed to the second rotary shaft so as to rotate together with the second rotary shaft. The ring gear has inner teeth meshed with the pinion and outer teeth connected to the first rotary shaft. The transmission gear is provided rotatably on the second rotary shaft in the vicinity of the sun gear and the pinion. A hub part of the transmission gear is connected to a supporting pin of the pinion thereby forming the transmission belt into an output gear.

Each of the rotary shafts may be divided into plural parts. In detail, in a continuous speed-shifting device of claim 11, each of the first and second rotary shafts is composed of: a gear shaft part rotatably supported to a casing and connected to the differential gear mechanism; and a pulley shaft part which is rotatably supported to the casing, supports the variable speed pulley, is located coaxially with respect to the gear shaft part and is removably connected to the gear shaft part.

The casing may be divided into three parts. In detail, in a continuous speed-shifting device of claim 12, the casing is composed of: a first casing part which covers the side on which the differential gear mechanism is disposed and rotatably supports the end parts of the first and second rotary shafts on the differential gear mechanism side; a second casing part which covers the outer periphery of the differential gear mechanism and in which openings are formed at both sides thereof respectively and one of the openings is adjacent to an opening of the first casing part; and a third casing part which is adjacent to the other opening side of the second casing part, covers the outer periphery of the variable speed pulley mechanism and the side on which the variable speed pulley mechanism is disposed and rotatably supports the end parts of the first and second rotary shafts on the variable speed pulley mechanism side.

The casing supporting the rotary shafts divided into plural parts in claim 11 may be divided into three parts as in claim 12.

In a continuous speed-shifting device of claim 14, the tension mechanism of the variable speed pulley mechanism has a tension pulley which is disposed between both the spans of the belt wound between both the variable speed pulleys for pressing the inner faces of the spans.

In a continuous speed-shifting device of claim 15, the tension mechanism in claim 14 comprises: first and second tension arms each of which is pivotally supported to an axis parallel with the axes of the first and second rotary shafts; First and second tension pulleys disposed on the inner face side of the belt and supported to the first and second tension arms respectively so as to rotate around respective axes parallel with the axes of the first and second rotary shafts; and forcing means which is interposed between the first and second tension arms and forces the first and second tension pulleys so as to move them away from each other thereby pressing the first tension pulley on the inner face of one span of the belt and pressing the second tension pulley on the inner face of the other span thereof.

In a continuous speed-shifting device of claim 16, an attaching arm part is integrally provided on the second tension arm in claim 15 so as to rotate together with the second tension arm. The forcing means is a tension spring interposed between the attaching arm part of the second tension arm and the first tension arm. The tension spring rotates the attaching arm part and the first tension arm in a direction in which the angle therebetween becomes smaller thereby forcing the first and second tension pulleys in a direction in which they are moved away from each other.

In a continuous speed-shifting device of claim 17, the first and second tension arms are pivotally provided around the axis of one of the first and second rotary shafts. Further, the attaching arm part is provided so as to extend in a direction at approximately right angles to the body of the second tension arm. The tension spring is disposed approximately along with a connection line between the first and second rotary shafts.

DESCRIPTION OF THE PREFERRED EMBODIMENT

Description is made below about an embodiment of the present invention.

Figure 1:
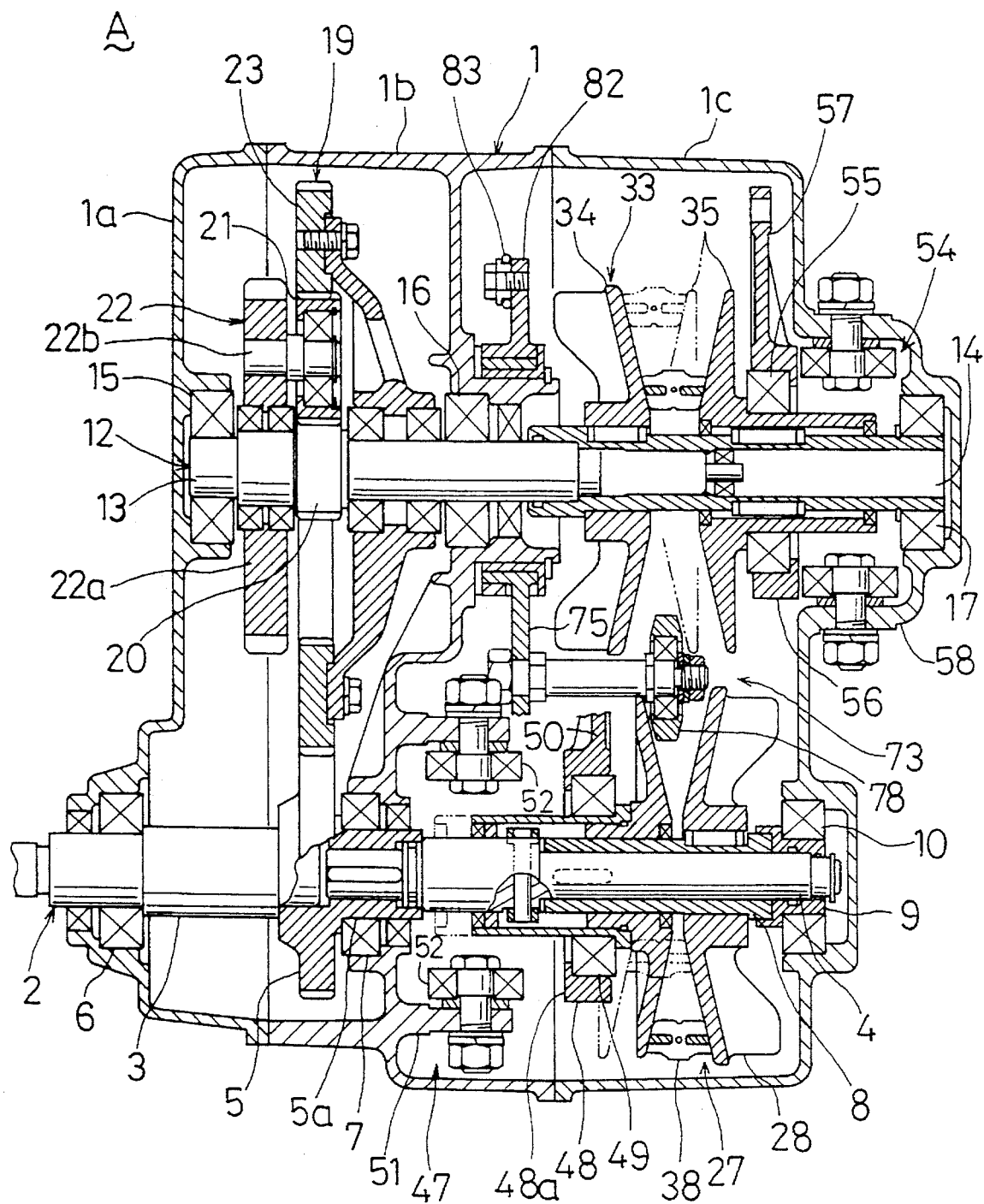
FIG. 1 is a cross section showing a whole structure of an embodiment of a continuous speed-shifting device of this invention.
Figure 2:
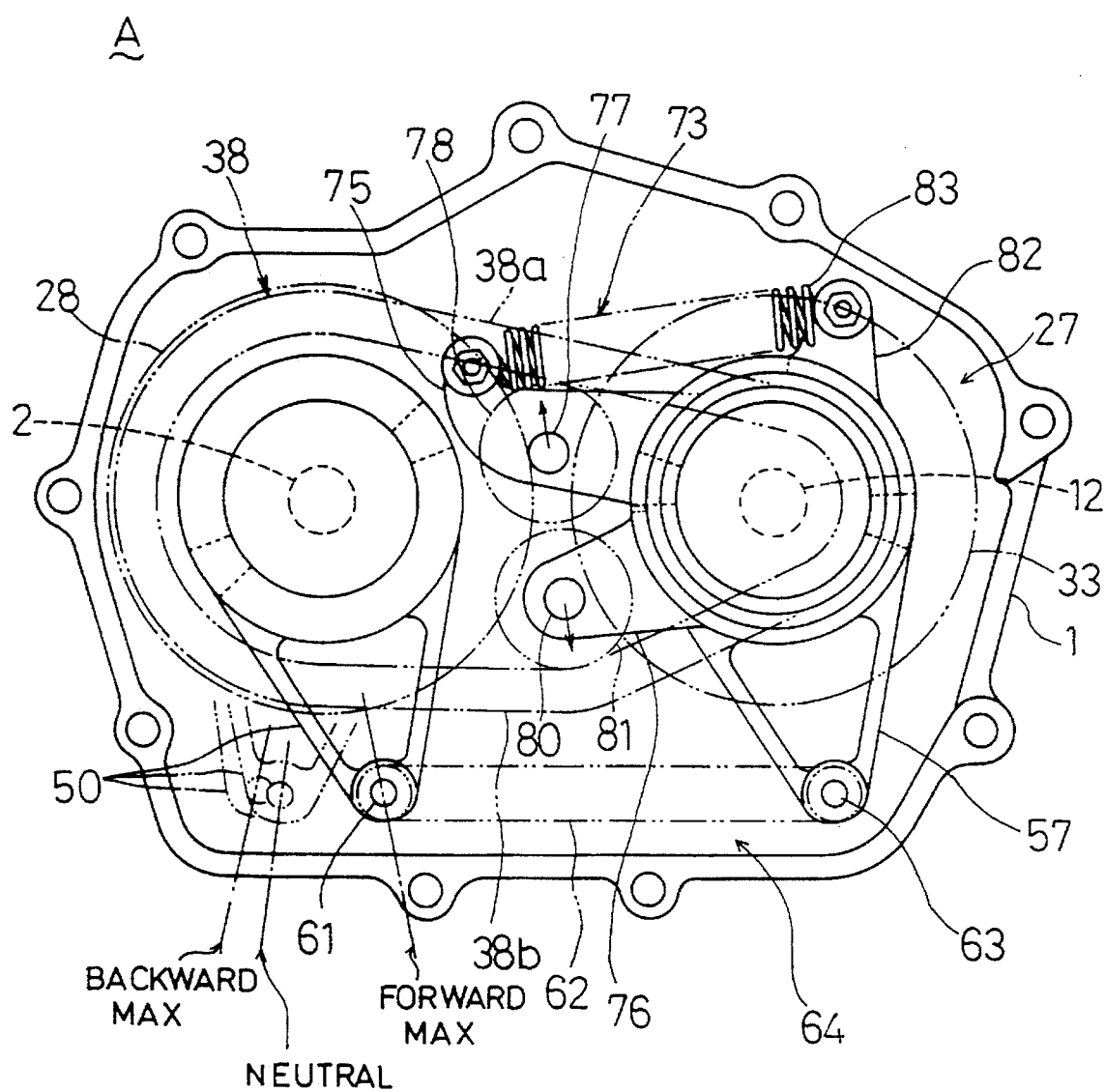
FIG. 2 is an elevation showing a construction of a variable speed pulley mechanism of the continuous speed-shifting device.

FIGS. 1 and 2 show a whole construction of an embodiment of a continuous speed-shifting device A of the present invention. The continuous speed-shifting device A is disposed on a power transmission channel between an engine and driving wheels in a vehicle such as a lawn mower and an agricultural machine.

In FIGS. 1 and 2, reference numeral 1 is a casing of the continuous speed-shifting device A. The casing 1 is divided into first, second and third divisional casings 1a, 1b, 1c in the order from left to right in FIG. 1.

Figure 3:
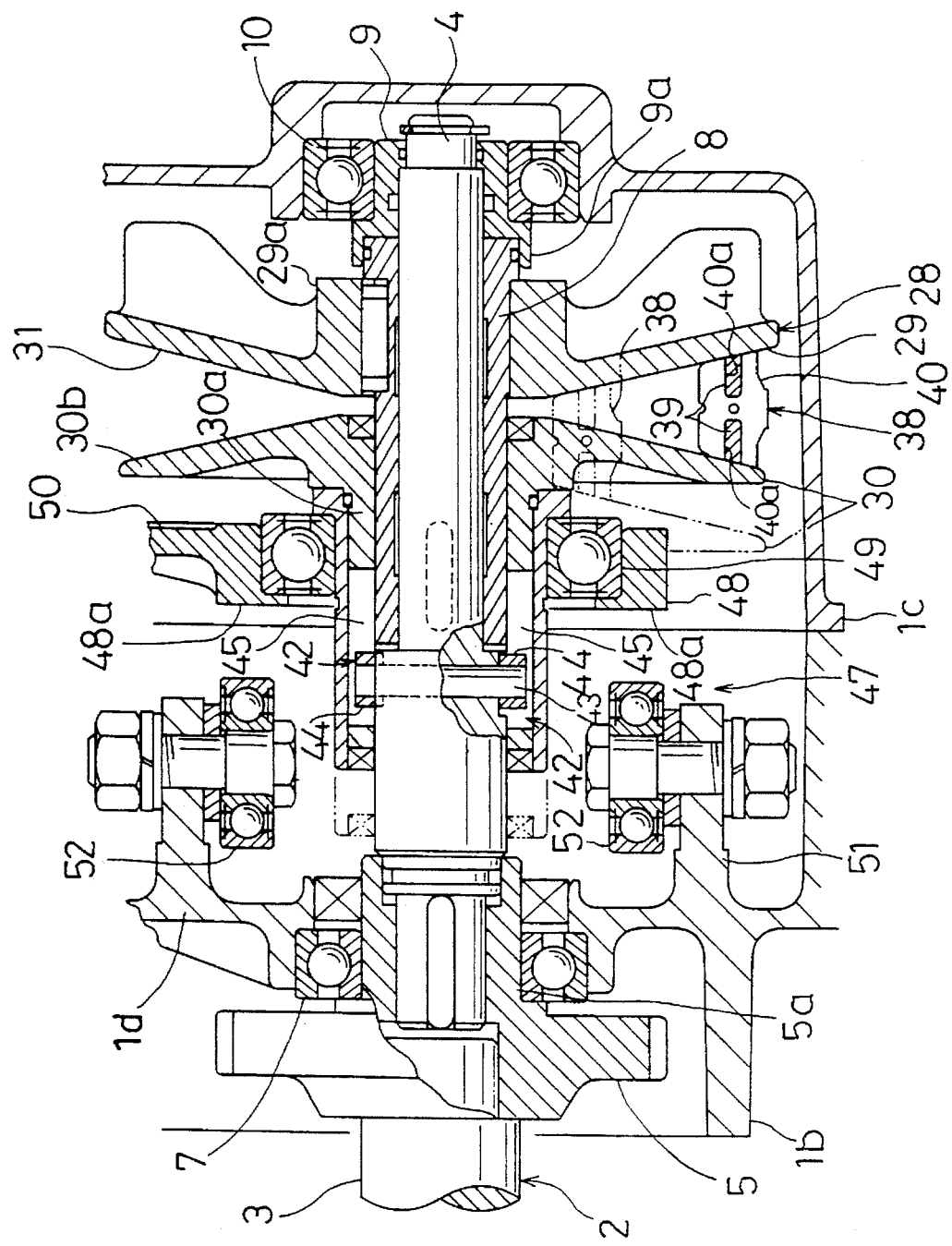
FIG. 3 is an enlarged cross section showing a construction of a first variable speed pulley of the variable speed pulley mechanism and a construction of the periphery thereof.

At the inside of the casing 1, first and second rotary shafts 2, 12 are disposed in parallel with each other on an approximately horizontal surface. The first and second rotary shafts 2, 12 are rotatably supported to the casing 1. The first rotary shaft 2 forms an input part (input shaft) and is divided into a gear shaft part 3 and a pulley shaft part 4. An end (left end in FIG. 1) of the gear shaft part 3 is protruded from the inside to the outside of the casing 1, while the other end is located between the first and second divisional casings 1a, 1b and is coaxially and integrally welded to a gear 5 having a boss part 5a passing through the second divisional casing 1b so that the gear shaft part 3 can rotate together with the gear 5. The gear shaft part 3 is supported at the intermediate part thereof to the first divisional casing 1a via a bearing 6. The gear 5 is supported at a hollow boss part 5a thereof to a central flange part 1d of the second divisional casing 1b via a bearing 7. The pulley shaft part 4 is placed between the second and third divisional casings 1b, 1c. An end (left end in FIG. 1) of the pulley shaft part 4 is formed small in diameter and is engaged removably with the inner periphery of the boss part 5a of the gear 5 integral with the gear shaft part 3 so as to rotate together with the gear 5. The half portion located on the other end side of the pulley shaft part 4 is formed into a small diameter part with a smaller diameter. As also shown in FIG. 3, the outer periphery of the small diameter part is engaged on the gear shaft part 3 side thereof with an end of a sleeve 8 and engaged on the opposite side of the gear shaft part 3 with a bush 9. The end of the sleeve 8 is engaged with a large diameter part 9a formed at the bush 9. The pulley shaft part 4 is supported to the third divisional casing 1c via the bush 9 and a bearing 10.

Figure 4:
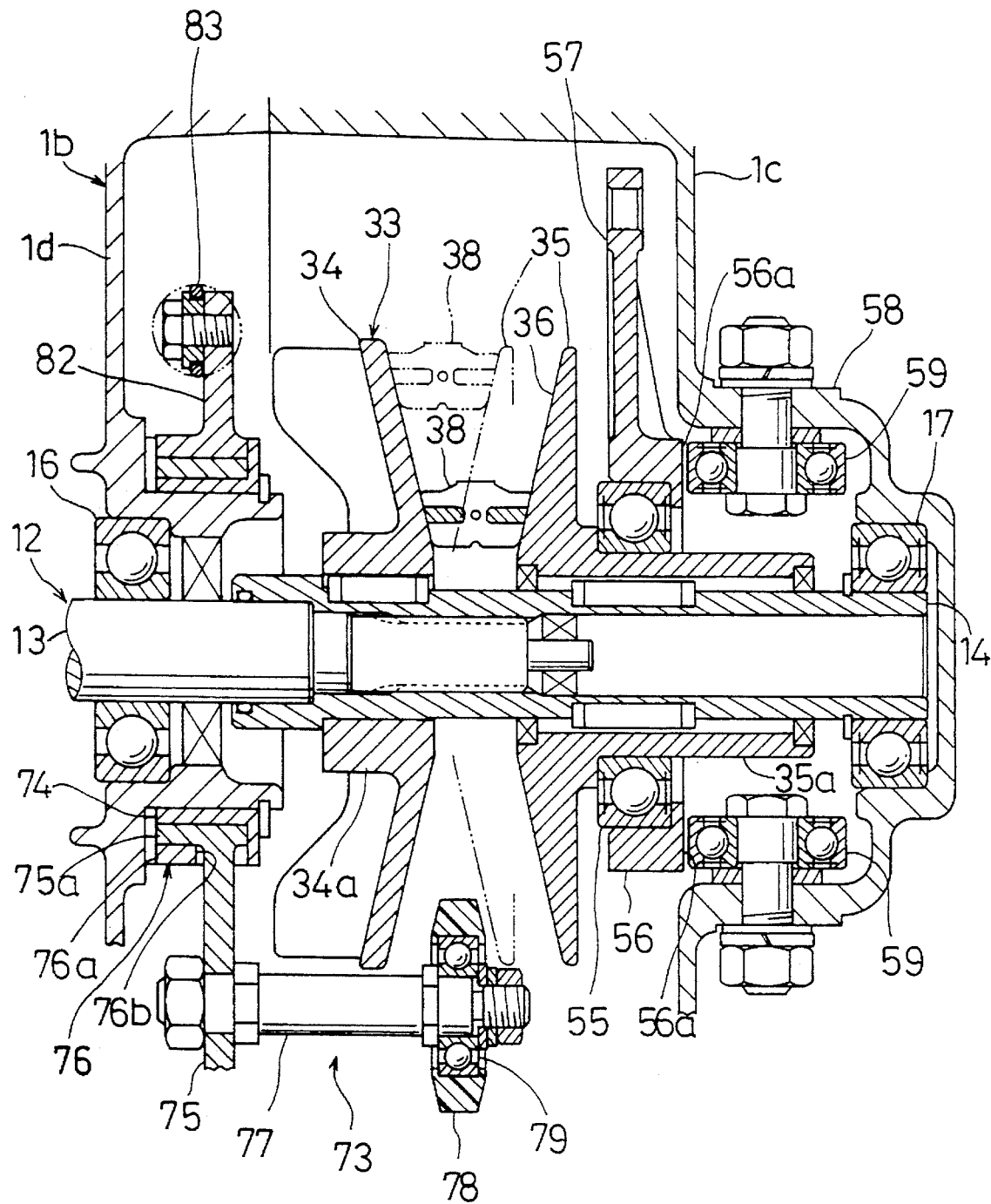
FIG. 4 is an enlarged cross section showing a construction of a second variable speed pulley of the variable speed pulley mechanism and a construction of the periphery thereof.

The second rotary shaft 12 is divided into a gear shaft part 13 and a pulley shaft part 14 as in the case of the first rotary shaft 2. As also shown in FIGS. 3 and 4, the gear shaft part 13 passes through the second divisional casing 1b. The gear shaft part 13 is supported at an end (left end in FIG. 1) of thereof to the first divisional casing 1a via a bearing 15 and supported at an intermediate part thereof to the second divisional casing 1b via a bearing 16. The pulley shaft part 14 is cylindrical and is disposed between the second and third divisional casings 1b, 1c. An end (left end in FIG. 1) of the pulley shaft part 14 is removably spline-connected to the other end of the gear shaft part 13 so that the pulley shaft part 14 can rotate together with the gear shaft part 13, while the other end of the pulley shaft part 14 is supported to the third divisional casing 1c via a bearing 17.

More specifically, the first divisional casing 1a covers the side on which the below-mentioned planetary gear mechanism 19 is disposed, and rotatably supports both ends of the first and second rotary shafts 2, 12 which are located on the planetary gear mechanism 19 side. Both sides of the second divisional casing 1b are formed into openings, and one opening side is adjacent to an opening surface of the first divisional casing 1a (right end in FIG. 1). The second divisional casing 1b covers the outer periphery of the planetary gear mechanism 19. Further, the second divisional casing 1b rotatably supports at the central flange part 1d thereof to the intermediate parts of the first and second rotary shafts 2, 12. The third divisional casing 1c is adjacent to the other opening side (right end in FIG. 1) of the second divisional casing 1b, covers the side on which the below-mentioned variable speed pulley mechanism 27 is disposed, and rotatably supports both ends of the first and second rotary shafts 2, 12 which are located on the variable speed pulley mechanism 27 side.

Under the above construction, if the casing 1 is divided into two parts, namely, the part composed of the first and second divisional casings 1a, 1b and the part composed of the third divisional casing 1c and if the rotary shafts 2, 12 are divided into the gear shaft parts 8, 18 and the pulley shaft parts 4, 14, the continuous speed-shifting device A can be unitized and divided into the planetary gear mechanism 19 and the variable speed pulley mechanism 27.

Figure 13:
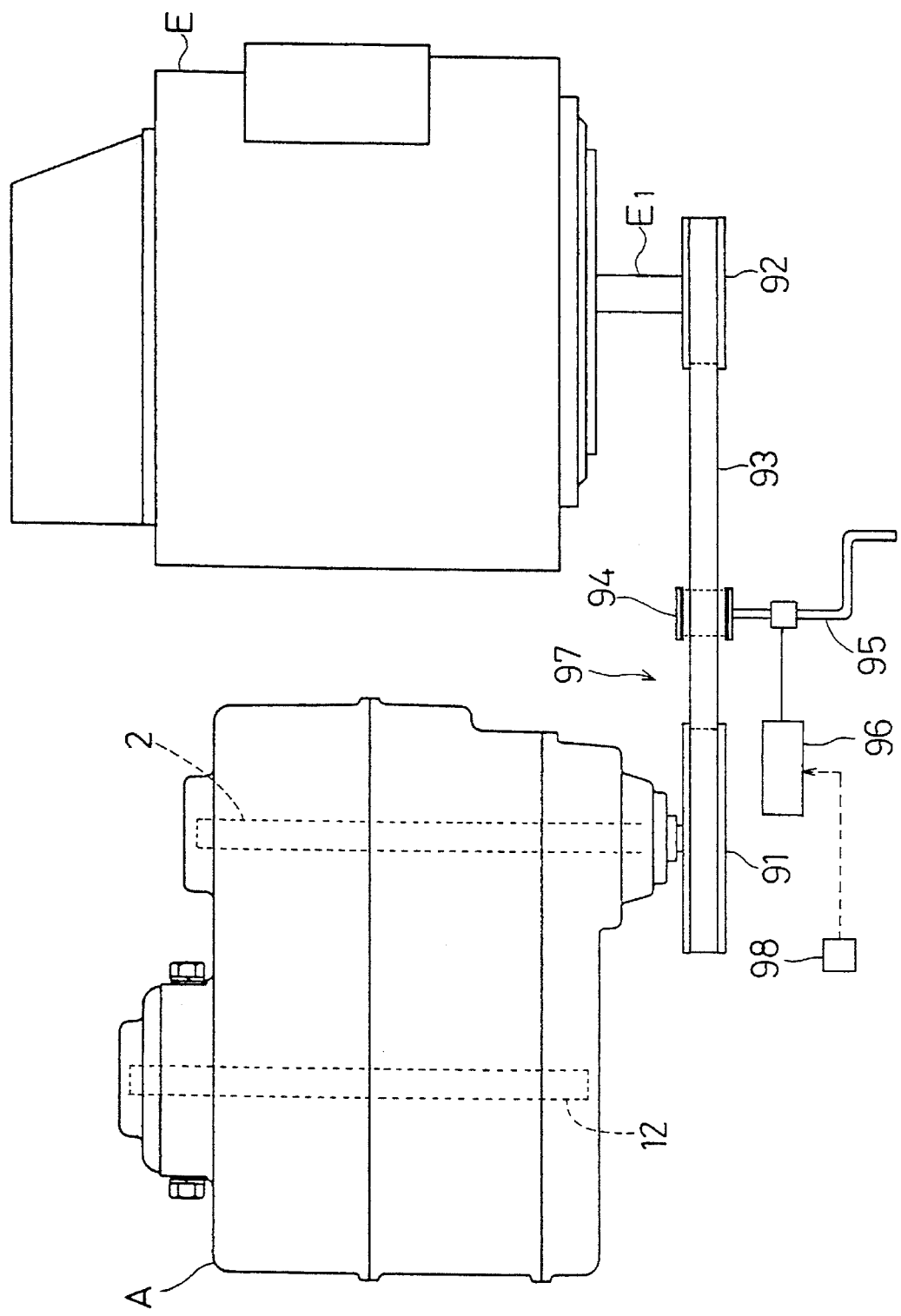
FIG. 13 is a plan view showing a state in which the continuous speed-shifting device is connected to an engine.
Figure 14:
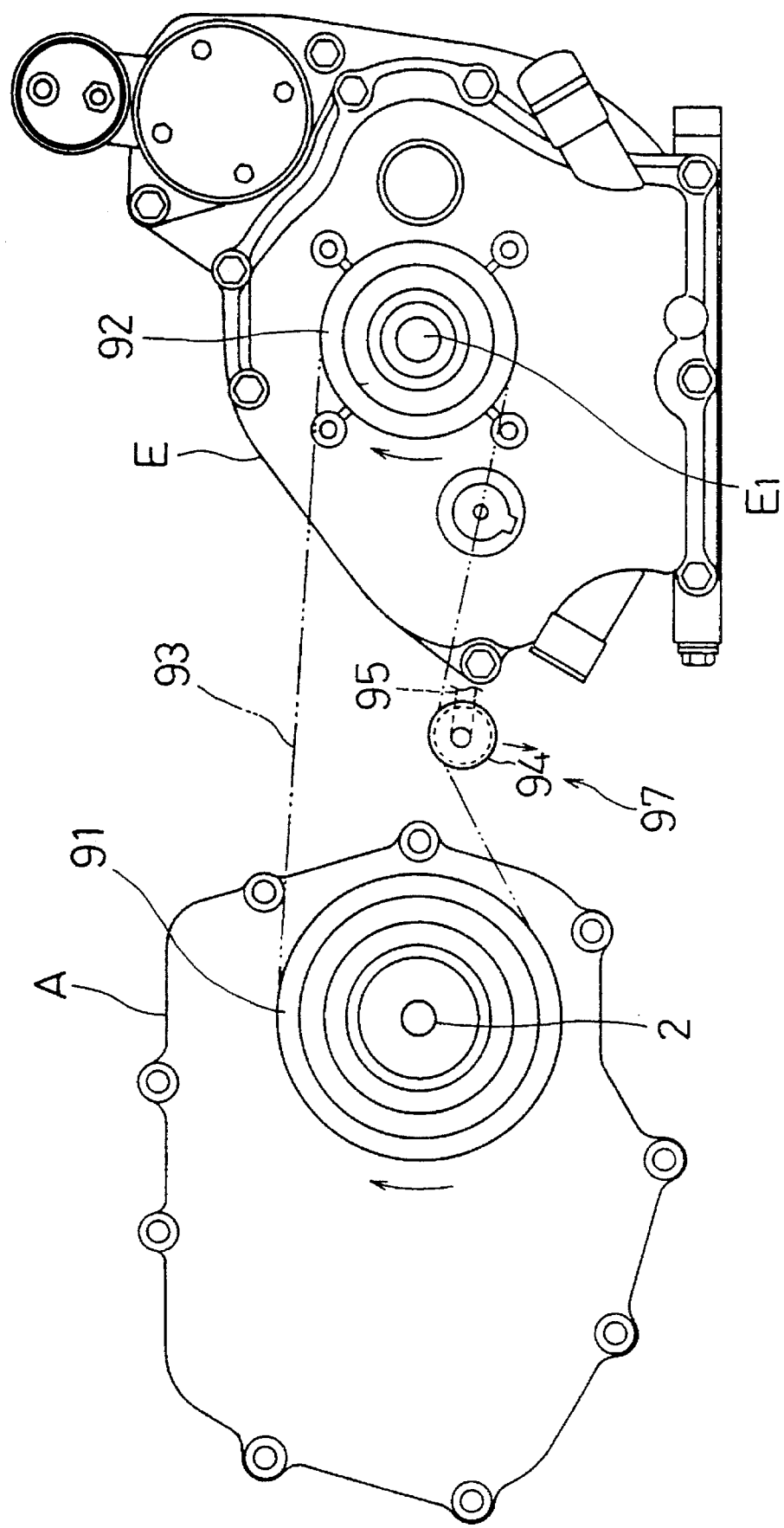
FIG. 14 is an elevation showing the state in which the continuous speed-shifting device is connected to the engine.

As shown in FIGS. 13 and 14, a driven pulley 91 formed of a V-grooved pulley is integrally attached to the end of the first rotary shaft 2 which protrudes from the casing 1, so as to rotate together with the first rotary shaft 2. A V-belt 93 is wound between the driven pulley 91 and a driving pulley 92 formed of a V-grooved pulley attached to an output shaft E1 of an engine E. The driving pulley 92 transmits the power of the engine E to the first rotary shaft 2 of the continuous speed-shifting device A via the V-belt 93.

Provided between both the pulleys 91, 92 is a tension pulley 94 for pressing the slack side span of the V-belt 93 from the belt back side. The tension pulley 94 is rotatably supported to a shaft located at the tip end of the tension arm 95. The tension arm 95 is forced by a no-shown spring or the like so as to rotate in a direction that the tension pulley 94 presses the belt 93. An actuator 96 such as an air cylinder is provided for rotating the tension arm 95 on the opposite side to the direction of pressing the belt so as to resist against the force by the spring or the like. The tension pulley 94, the tension arm 95 and the actuator 96 form a tension clutch 97 for canceling the thrust to the V-belt 93 to intercept the power transmission between both the pulleys 91, 92, namely, between the engine E and the speed-shifting device A.

Further, there is provided a limit switch 98 for detecting that the continuous speed-shifting device A has become a neutral state by switching the below-mentioned operating lever 66 to the neutral position. When receiving a signal informing of the neutral state of the continuous speed-shifting device A from the limit switch 98, the actuator 96 such as an air cylinder operates. At the neutral state of the continuous speed-shifting device A, the tension clutch 97 intercepts the power transmission from the engine E to the speed-shifting device A, so that the speed-shifting device A becomes in a state that it is connected only to the wheel side.

Housed in the casing 1 are the planetary gear mechanism 19 as a differential gear mechanism disposed on the second rotary shaft 12 (at the left end of FIG. 1) and a variable speed pulley mechanism 27 for connecting both the rotary shafts 2, 12 variably in speed by the V-belt 38.

Figure 5:
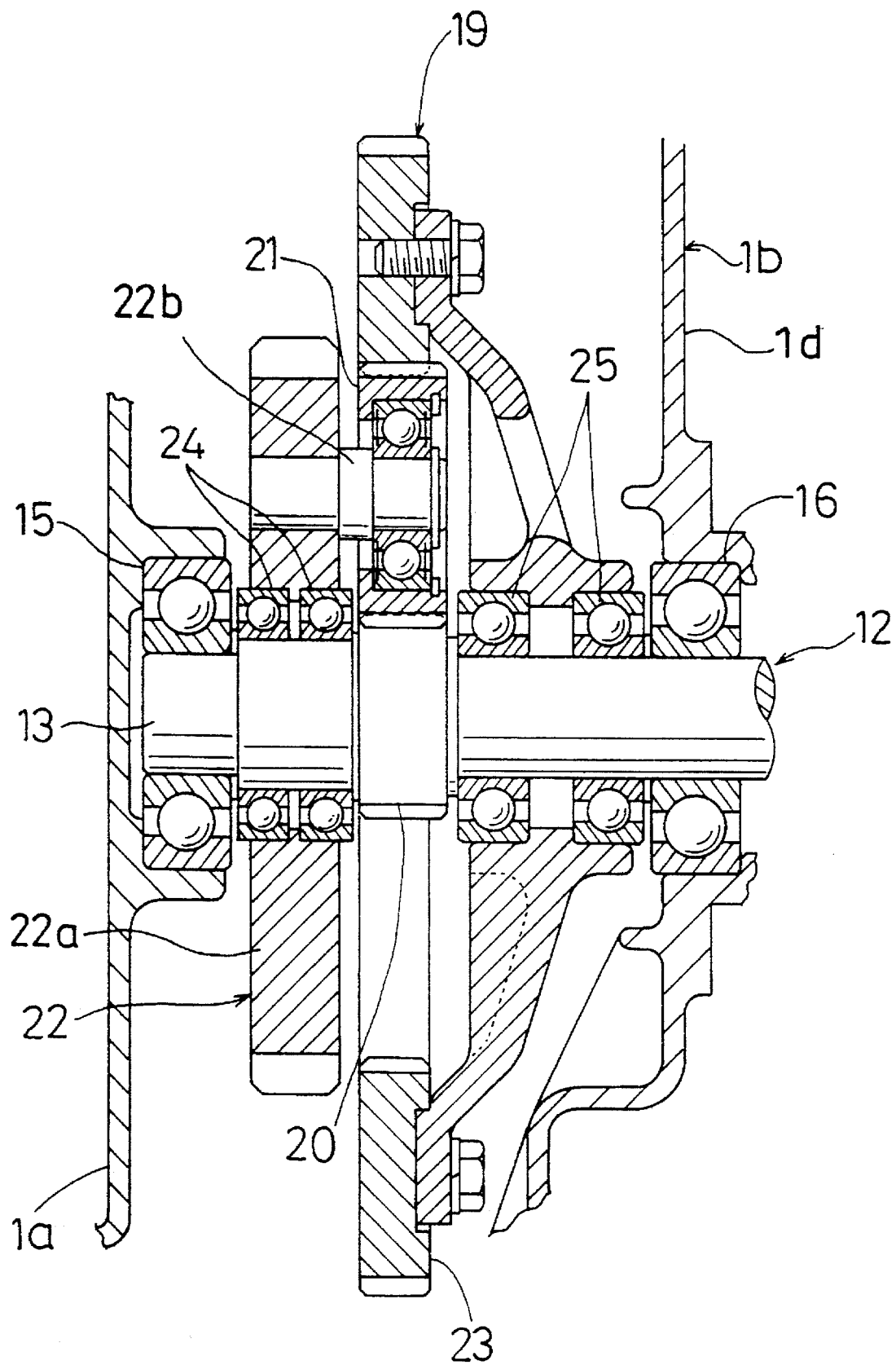
FIG. 5 is an enlarged cross section showing a construction of a differential gear mechanism and a construction of the periphery thereof.

As shown in an enlarged diagram of FIG. 5, the planetary gear mechanism 19 has (a) a sun gear 20 as the second gear element formed around the gear shaft part 13 located between the first and second divisional casings 1a, 1b, (b) a plurality of pinions 21, 21 . . . meshed with the sun gear 20, (c) an output gear 22 (transmission gear) as the third gear element which is rotatably supported to the second rotary shaft 12 at the portion of the gear shaft part 13 close to the first divisional casing 1a via bearings 24, 24 and which rotatably supports the pinions 21, 21 . . . . and (d) a ring gear 23 as the first gear element which is disposed at the outermost periphery of the second rotary shaft 12, is rotatably supported to the gear shaft part 13 via bearings 25, 25 and is meshed at an inner periphery thereof with the pinions 21, 21 . . . The ring gear 23 is meshed at an outer periphery thereof with the gear 5 on the first rotary shaft 2. The output gear 22 forms an output part of the speed-shifting device A and is connected to no-shown driving wheels.

In detail, the output gear 22 is rotatably attached to the second rotary shaft 12 in the vicinity of the sun gear 20 and the pinions 21. A supporting pin 22b of the pinion 21 is attached to a hub part 22a of the output gear 22. The supporting pin 22b extends in parallel with the second rotary shaft 12 and the pinion 22 is rotatably attached to the tip part of the supporting pin 22b. Thus, the output gear 22 doubles a pinion carrier of the planetary gear mechanism 19.

The variable speed pulley mechanism 27 has a first variable speed pulley 28 disposed on the pulley shaft part 4 of the first shaft part 2 which is located between the second and third divisional casings 1b, 1c. As shown in an enlarged diagram of FIG. 3, the first variable speed pulley 28 is composed of a flange-shaped fixed sheave 29 non-slidably key-connected at a boss part 29a thereof to the sleeve 8 on the pulley shaft part 4 of the first rotary shaft 2 so as to rotate together with the first rotary shaft 2, and a flange-shaped movable sheave 30 supported slidably and relatively rotatably at a boss part 30a thereof to the sleeve 8 so as to be opposite to the fixed sheave 29 on the sleeve 8. A pulley groove 31 is formed between both the sheaves 29, 30. The movable sheave 30 is made of iron and the boss part 30a is integrally formed with the sheave body 30b by forging.

On the pulley shaft part 14 of the second rotary shaft 12, there is provided a second variable speed pulley 33 with the same diameter as in the first variable speed pulley 28. As shown in an enlarged diagram of FIG. 4, the second variable speed pulley 33 has the same construction as in the first variable speed pulley 28, that is, is composed of a flange-shaped fixed sheave 34 non-slidably key-connected at a boss part 34a thereof to the pulley shaft part 14 of the second rotary shaft 12 so as to rotate together with the second rotary shaft 12, and a flange-shaped movable sheave 35 supported slidably and relatively rotatably at a boss part 35a thereof to the pulley shaft part 14 so as to be opposite to the fixed sheave 34 in the reverse position with respect to the position of the movable sheave 30 to the fixed sheave 29 in the first variable speed pulley 28. A pulley groove 36 is formed between both the sheaves 34, 35.

A V-belt 38 formed of a block belt is wound between the pulley groove 31 of the first variable speed pulley 28 and the pulley groove 36 of the second variable speed pulley 33. Respective diameters at which the belt is wound around respective variable speed pulleys 28, 33 are varied in such a manner that the respective movable sheaves 30, 35 of the pulleys 28, 33 are moved toward and away from the respective fixed sheaves 29, 34. For example, when the movable sheave 30 of the first variable speed pulley 28 is moved toward the fixed sheave 29 and the movable sheave 35 of the second variable speed pulley 33 is moved away from the fixed sheave 34, the diameter at which the belt is wound around the first variable speed pulley 28 is larger than the diameter at which the belt is wound around the second variable speed pulley 33 so that the rotation of the first rotary shaft 2 is transmitted to the second rotary shaft 12 at increased speed. On the contrary, when the movable sheave 30 of the first variable speed pulley 28 is moved away from the fixed pulley 29 and the movable sheave 35 of the second variable speed pulley 33 is moved toward the fixed sheave 34, the diameter at which the belt is wound around the first variable speed pulley 28 is smaller than the diameter at which the belt is wound around the second variable speed pulley 33, that is, the diameter at which the belt is wound around the second variable speed pulley 33 is larger, so that the rotation of the first rotary shaft 2 is transmitted to the second rotary shaft 12 at reduced speed.

As illustrated in FIG. 3, the V-belt 38 is composed of (a) a pair of endless tension bands 39, 39 which are each formed so that a plurality of tension cords are embedded at the intermediate portion in a thickness direction of a form maintaining layer made of fiber-reinforced rubber, fiber-reinforced plastic or the like, and (b) many blocks 40, 40 . . . each of which is approximately trapezoidal, has respective engagement parts 40a, 40a for engaging with the respective tension bands 39, 39 and is contactable at the right and left sides thereof with the pulley grooves 31, 36 of the pulleys 28, 33. On both surfaces of each tension band 39, concavities (or convexities) are formed. On the opposite surfaces of each engagement part 40a of the blocks 40, convexities (or concavities) are formed so as to engage with the concavities (or convexities) of the tension band 39, though they are not shown in FIG. 3. By engaging the concavities and convexities with each other, the blocks 40, 40 are fixed in a longitudinal direction of the belt to the tension bands 39, 39. Thus, the V-belt 38 can be employed for a high-load transmission belt having high lateral-pressure resistance.

Figure 6:
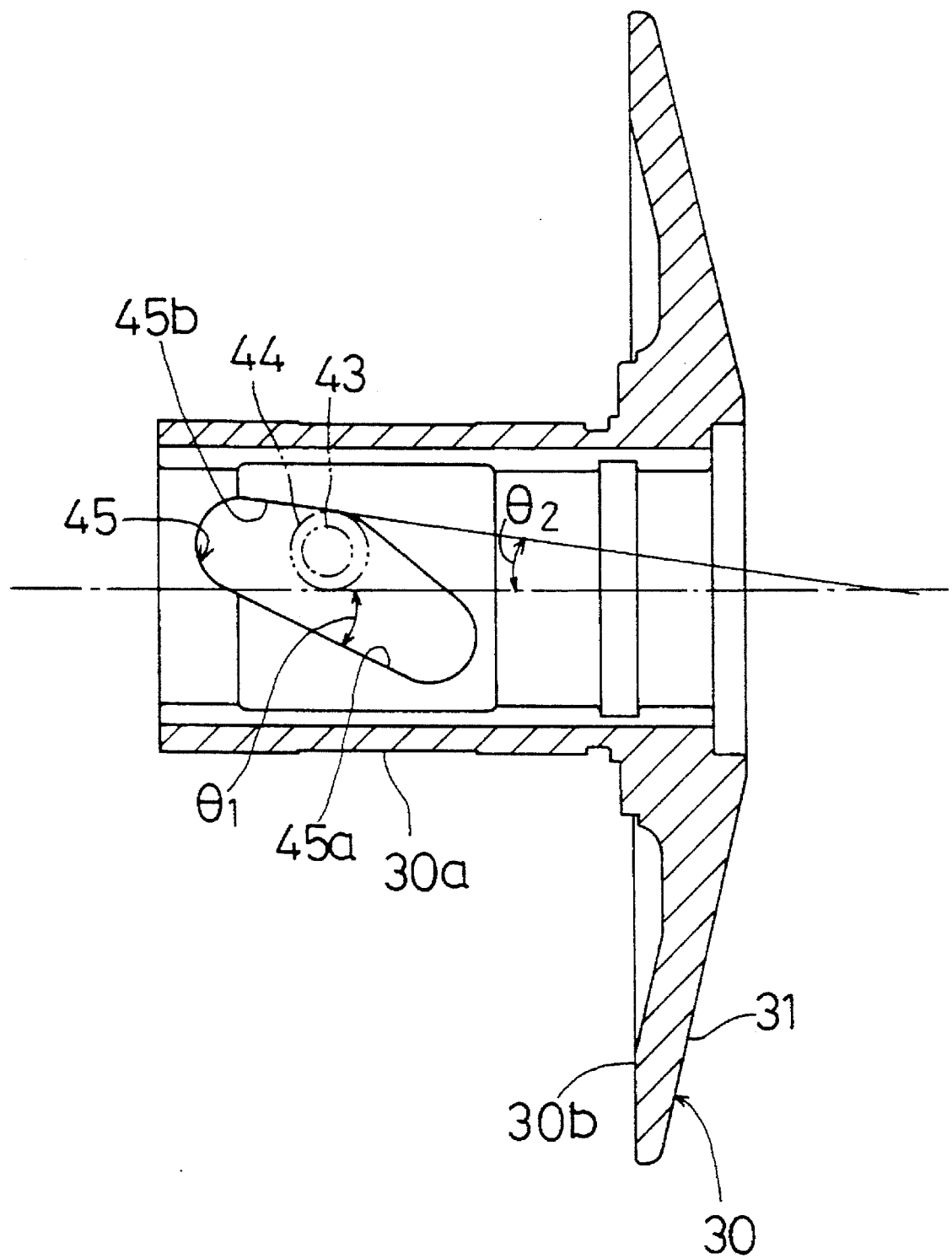
FIG. 6 is an enlarged cross section of a movable sheave of the first variable speed pulley.
Figure 7:
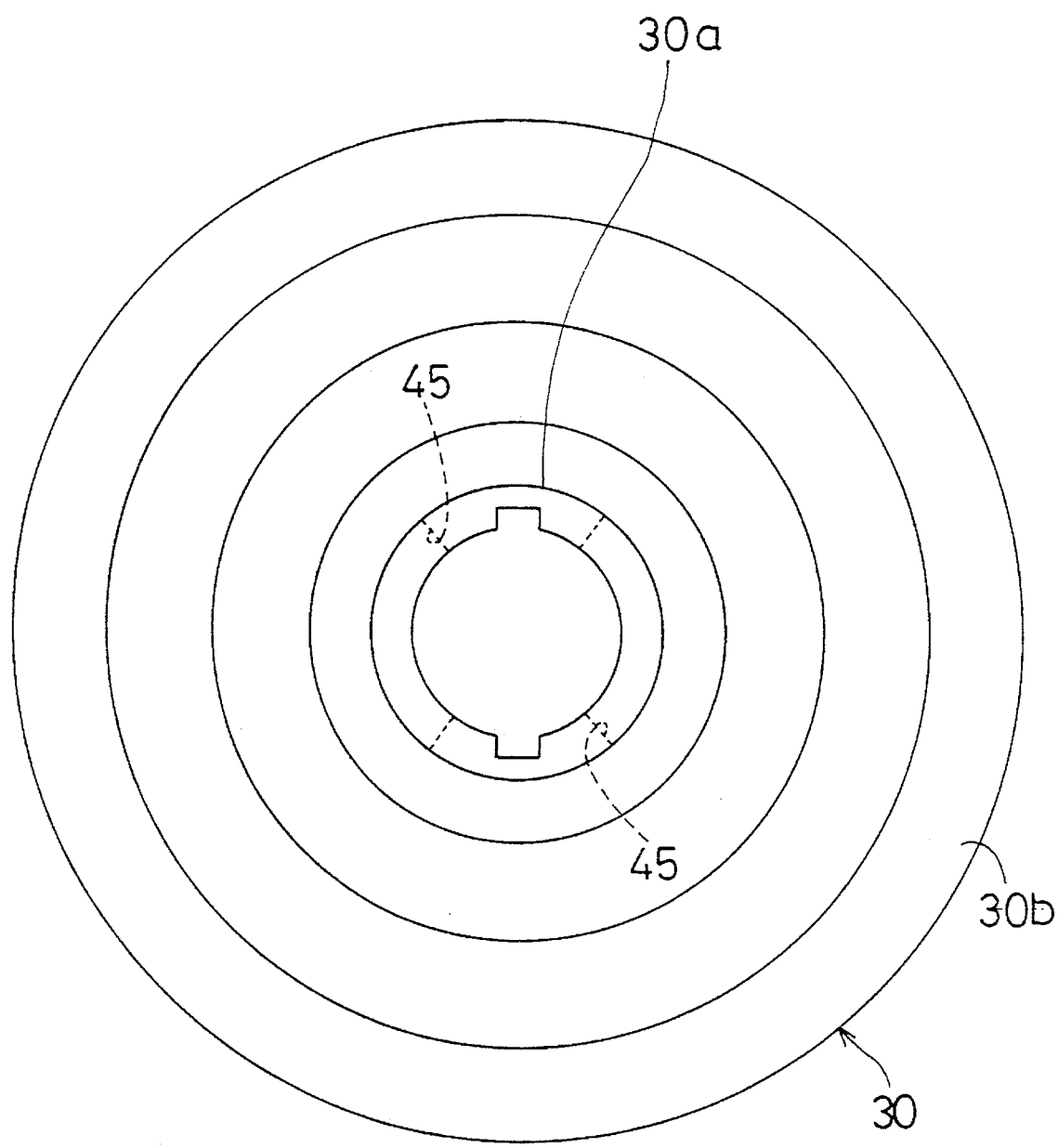
FIG. 7 is an enlarged elevation of the movable sheave.
Figure 8:
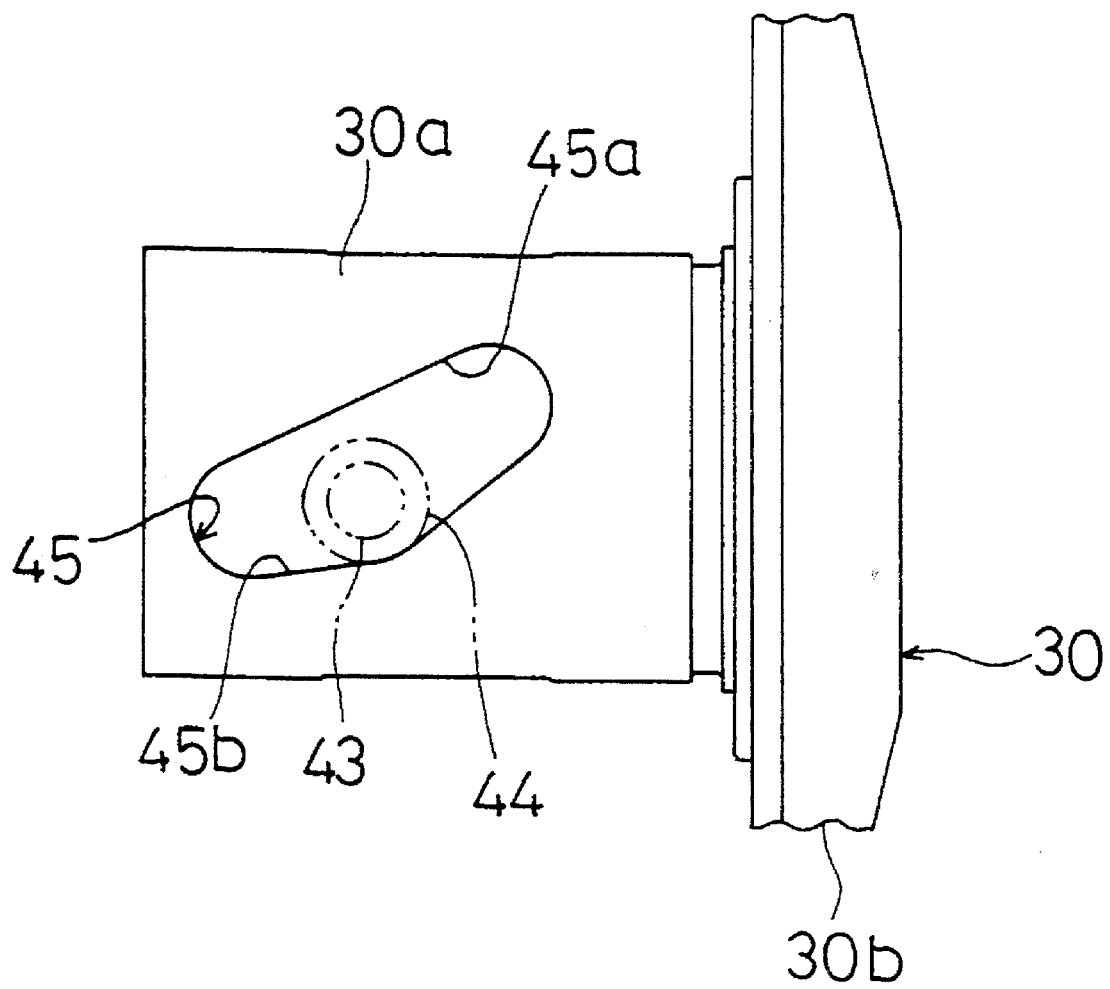
FIG. 8 is an enlarged elevation of a torque cam groove.

A torque cam mechanism 42 is provided between the boss part 30a of the movable sheave 30 of the first variable speed pulley 28 and the pulley shaft part 4 of the first rotary shaft 2. As is also shown in FIGS. 6 to 8, the torque cam mechanism 42 is composed of (a) a torque pin 43 formed of a linear pin which passes through the first rotary shaft 2 so as to protrude at both tip portions thereof from the outer periphery of the first rotary shaft 2 and is fixed at the tip portions to the first rotary shaft 2, (b) torque rings 44 rotatably engaged with the respective tip portions of the torque pin 43, and (c) torque cam holes 45 which are each formed in such a manner as to pass through the boss part 30a of the movable sheave 30 and are engaged with the respective torque rings 44 of the tip portions of the torque pin 43. The torque cam hole 45 is formed approximately triangularly as shown in FIGS. 6 and 8. At one side wall of the torque cam hole 45, there is formed a forward side cam face 45a inclining by a set lead angle θ1 (for example, θ1=26°) with respect to the direction parallel with the axis of the first rotary shaft 2. At the other side wall of the torque cam hole 45, there is formed a backward side cam face 45b inclining by a lead angle θ2 smaller than the forward side cam face 45a (for example, θ2=8°<θ1) . The torque cam mechanism 42 is operated at the power transmission times of forward and backward states of the continuous speed-shifting device A (vehicle), thereby operating on the belt 38 the thrust which acts in a reverse direction between the forward and backward states and moving the respective movable sheaves 30, 35 toward the respective fixed sheaves 29, 34 so as to obtain the larger thrust at the forward state.

On the pulley shaft part 4 of the first rotary shaft 2, a first cam mechanism 47 as a driving mechanism for moving the movable sheave 30 of the first variable speed pulley 28 toward and away from the fixed sheave 29 is provided at the back side of the movable sheave 30. The cam mechanism 47 has a rotating cam 48. The rotating cam 48 is engaged with and supported to, via a bearing 49, an outer periphery of a cylindrical collar engaged with the boss part 30a of the movable sheave 30 so as to cover the torque cam hole 45, so as to be relatively rotatable and axially move together with respect to the movable sheave 30. A pair of inclining cam faces 48a, 48a are formed at the end surface of the rotating cam 48 on the opposite side to the first variable speed pulley 28, with distances left at equal angles of 180° in a circumferential direction. A rotating lever 50 is integrally provided at the outer periphery of the rotating cam 48 so as to protrude from the outer periphery of the rotating cam 48.

On the back side of the rotating cam 48, a cylindrical fixed cam 51 is disposed as a cam follower formed integrally at the second divisional casing 1b and coaxially with respect to the first rotary shaft 2. Respective rollers 52, 52 for rotating in contact with the respective cam faces 48a, 48a of the rotating cam 48 are rotatably supported to the fixed cam 51.

On the pulley shaft part 14 of the second rotary shaft 12, a second cam mechanism 54 as a driving mechanism for moving the movable sheave 35 toward and away from the fixed sheave 34 is provided on the back side of the movable sheave 35 in the second variable speed pulley 33. The second cam mechanism 54 has the same construction as in the first cam mechanism 47, that is, has a rotating cam 56 engaged with and supported to, via a bearing 55, the outer periphery of the boss part 35a of the movable sheave 35, so as to be relatively rotatable and axially move together with respect to the movable sheave 35. A pair of inclining cam faces 56a, 56a are formed at the end surface of the rotating cam 56 on the opposite side to the second variable speed pulley 83, with distances left at equal angles of 180° in a circumferential direction. A rotating lever 57 is integrally provided at the outer periphery of the rotating cam 56 so as to protrude from the outer periphery of the rotating cam 56.

On the back side of the rotating cam 56, a cylindrical fixed cam 58 is disposed as a cam follower formed in such a manner as to swell the third divisional casing 1c outward and coaxially with respect to the second rotary shaft 12. Respective rollers 59, 59 for rotating in contact with the respective cam faces 56a, 56a of the rotating cam 56 are rotatably supported to the fixed cam 58.

Figure 9:
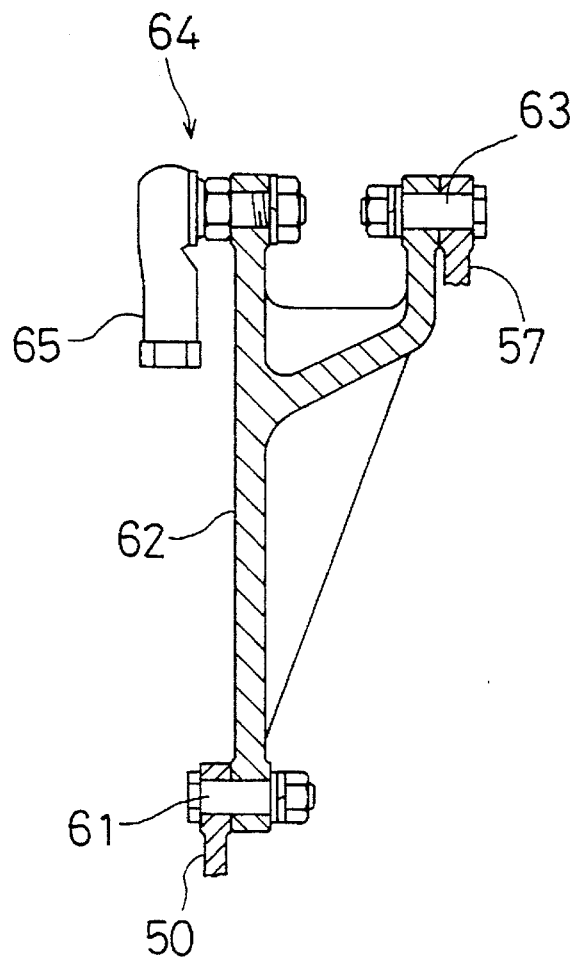
FIG. 9 is an enlarged plan view showing a link of a linkage mechanism.

As shown in FIGS. 2 and 9, an end of a link 62 is connected to the tip end of the rotating lever 50 of the first cam mechanism 47 via a pin 61. The other end of the link 62 is connected to the tip end of the rotating lever 57 of the second cam mechanism 54 via a pin 63. A linkage mechanism 64 is composed of the rotating levers 50, 57, the link 62 and the pins 61, 63. The linkage mechanism 64 connects both the cams 48, 56 of the cam mechanisms 47, 54 to each other to rotate them around the boss parts 30a, 35a of the movable sheaves 30, 35 and rotate the rollers 52, 59 on the cam faces 48a, 56a, thus moving the movable sheaves 30, 35 in an axial direction with respect to the fixed sheaves 29, 34 so as to move one of the movable sheaves 30, 35 toward the corresponding fixed sheave 29 or 34 while moving the other of the movable sheaves 30, 35 away from the corresponding fixed sheave 29 or 34. As a result, respective effective diameters of the pulley grooves 31, 36, namely, the respective diameters at which the belt is wound around the respective pulleys 28, 33, are variable so that the speed ratio between both the variable speed pulleys 28, 33 is changed.

Figure 15:
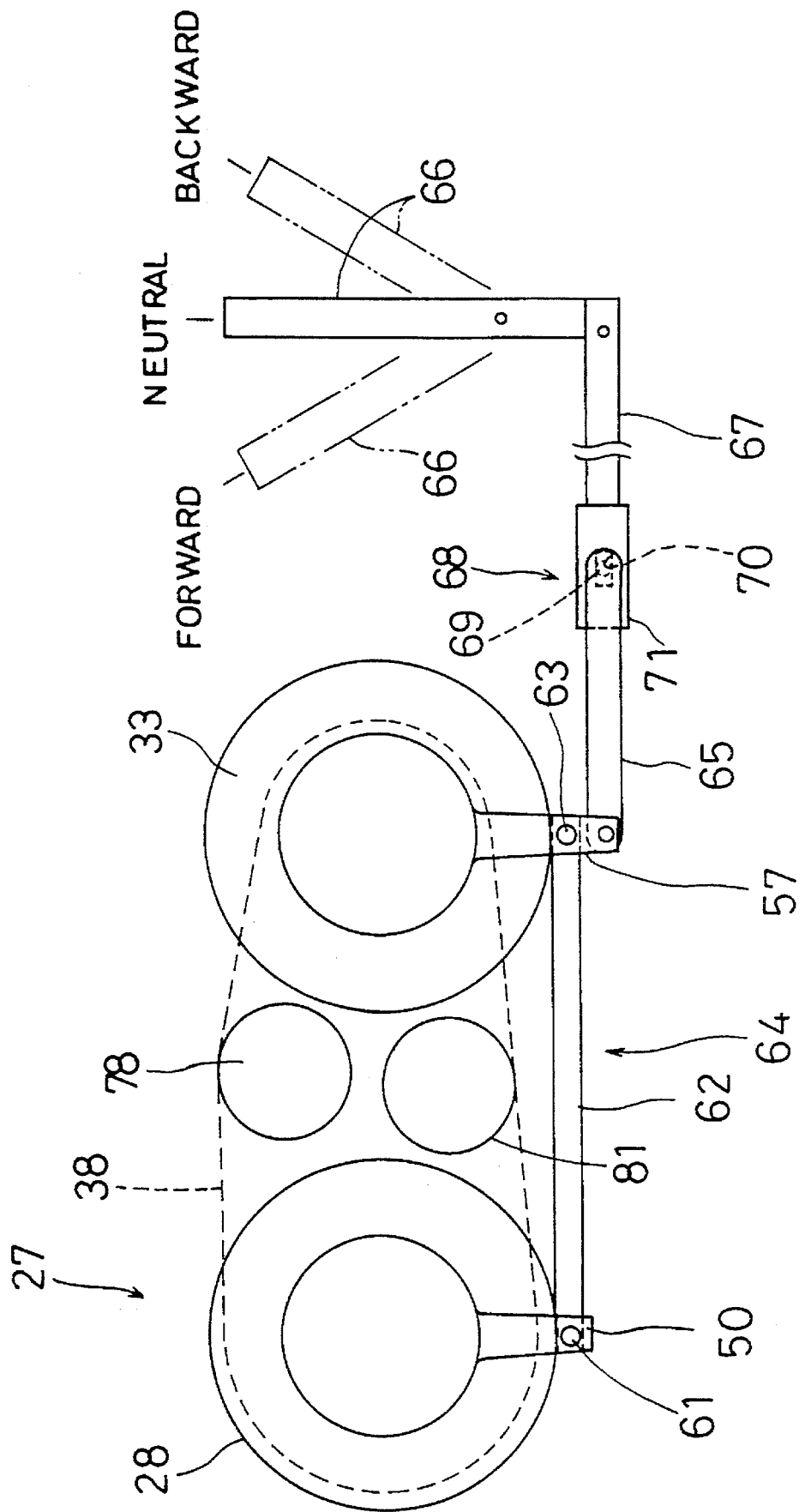
FIG. 15 is a schematic diagram showing a connection structure between the linkage mechanism and an operating lever.

As shown in FIG. 15, in the linkage mechanism 64 of the variable speed pulley mechanism 27, an end of a rod 65 is connected to the tip part of the rotating lever 57 of the second cam mechanism 54. The other end of the rod 65 is connected to an operating lever 66 as a switching operation part via a rod 67. The operating lever 66 pivots on, for example, a pivotal shaft among a forward highest speed position, a neutral position and a backward highest speed position. The shifting pattern of the operating lever 66 is so composed that when moved from the backward highest speed position to the forward highest speed position via the neutral position, the operating lever 66 is moved in a direction at right angles to the pivoting direction at the neutral position and then pivots toward the forward highest speed position. By the switching operation of the operating lever 66, the linkage mechanism 64 is operated to pivot the respective rotating arms 50, 57 protruding from the rotating cams 48, 56 among the forward highest speed position, the neutral position and the backward highest speed position (See FIG. 2). Thus, the speed ratio of the variable speed pulley mechanism 27 is changed so that the output gear 22 (output part) as a pinion carrier of the planetary gear mechanism 19 is shifted among the normal rotating state, the neutral state and the reverse rotating state with respect to the first rotary shaft 2 (input part). At the neutral state, for example, the diameter at which the belt is wound around the first variable speed pulley 28 is 108 mm while the diameter at which the belt is wound around the second variable speed pulley 33 is 72 mm. By setting a gear ratio of the planetary gear mechanism 19 and a connecting gear ratio with respect to the planetary gear mechanism 19, the continuous speed-shifting device A is so composed that at the forward state of the vehicle at which the output gear 22 is rotated in reverse to the first rotary shaft 2, the rotating speed of the ring gear 23 connected to the first rotary shaft 2 is higher than that of the sun gear 20 connected to the second rotary shaft 12.

A neutral zone part 68 is provided for interrupting the transmission of the operating force of the operating lever 66 to the linkage mechanism 64. The neutral zone part 68 has a pin member 69 provided on the opposite side of the rotating lever 38 of the rod 65 and an engagement member 71 provided at the end on the operating lever 66 side of the rod 67 and having an engagement part 70 for engaging with the pin member 69 in a longitudinal direction of the rod 67. The engagement part 70 is formed into a long groove (or slot) engaged slidably by a set distance with the pin member 69. By the relative movement of the pin member 69 at the engagement part 70, the neutral zone part 68 interrupts the transmission of the operating force of the operating lever 66 to the linkage mechanism 64 when the operating lever 66 is at the neutral position.

Figure 10:
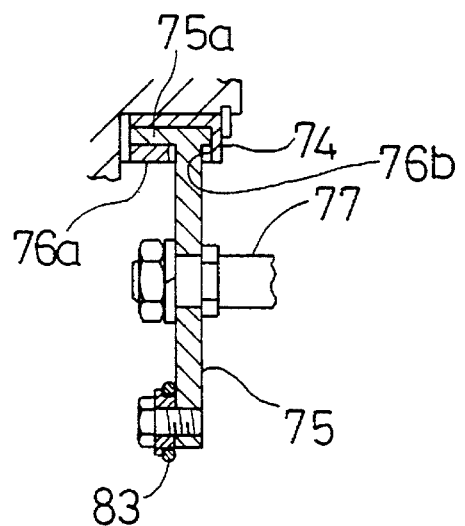
FIG. 10 is an enlarged cross section showing a state in which a spring is attached to a first tension arm.

A tension mechanism 73 is provided for pressing the slack side span, which is one of a pair of spans 38a, 38b of the V-belt 38 wound between the first and second variable speed pulleys 28, 33, outwardly from the inside between the spans 38a, 38b to give tension to the belt 38 thus generating a belt thrust. As shown in an enlarged diagram of FIG. 4, the tension mechanism 73 has a first tension arm 75 in which a boss part 75a thereof is rotatably supported via a collar 74 to a bearing part protruding from the second divisional casing 1b coaxially around the second rotary shaft 12, and a second tension arm 76 having a boss part 76a relatively rotatably supported around the boss part 75a of the first tension arm 75. An opening 76b for passing through the first tension arm 75 is formed on the boss part 76a of the second tension arm 76. As shown in FIG. 2, the first tension arm 75 extends toward the first rotary shaft 2 and the tip part thereof is bent upward. As shown in an enlarged diagram of FIG. 10, an end of a tension shaft 77 extending in parallel with both the rotary shafts 2, 12 is fixedly attached to the intermediate part of the first tension arm 75. The other end of the tension shaft 77 is located in the vicinity of the pulley grooves 31, 36 of the variable speed pulleys 28, 33 and rotatably supports via a bearing 79 a first tension pulley 78 for pressing one (upper) span 38a of the V-belt 38 from the inside. On the other hand, an end of a tension shaft 80 extending in parallel with both the rotary shafts 2, 12 is fixedly attached to the tip part of the second tension arm 76. The other end of the tension shaft 80 is located in the vicinity of the pulley grooves 31. 36 of the variable speed pulleys 28, 33 and rotatably supports via a bearing (no shown) a second tension pulley 81 for pressing the other (lower) span 38b of the V-belt 38 from the inside. Both the tension pulleys 78, 81 are positioned at the positions where each of the outer surfaces of the tension pulleys 78, 81 contacts a part of the inner surface of the belt 38 at any time and can press it, regardless less of the axial movement of the belt 38 due to the speed shifting.

A spring mounting arm 82 extending upward is integrally attached to the boss part 76a of the second tension arm 76. A tension spring 83 is hooked between the tip end of the spring mounting arm 82 and the tip end of the first tension arm 75. By the spring force of the tension spring 83, the first tension arm 75 is forced to rotate clockwise in FIG. 2 while the second tension arm 76 is forced to rotate counter-clockwise in FIG. 2, so that both the tension pulleys 78, 81 press the inner surfaces of the spans 38a, 38b of the V-belt 38. The force of the tension spring 83 to rotate the respective tension arms 75, 76 is set so that the respective tension pulleys 78, 81 press the slack side spans 38a, 38b of the belt 38 by tension larger than the largest tension generated at the slack side spans 38a, 38b. By the tension, a thrust to the belt 38 is generated.

Figure 11:
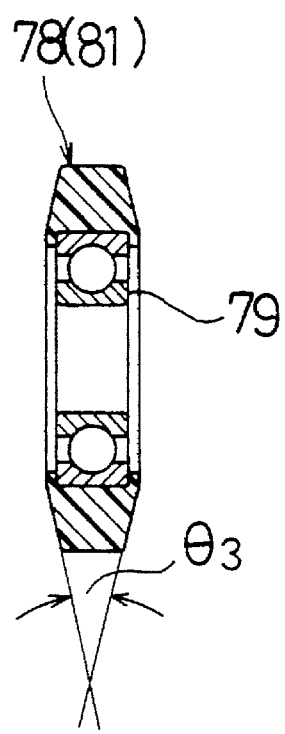
FIG. 11 is a cross section of a tension pulley of a tension mechanism.
Figure 12:
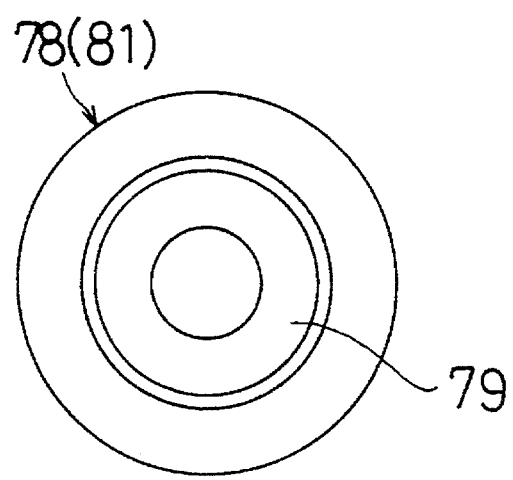
FIG. 12 is an elevation of the tension pulley of the tension mechanism.

As shown in enlarged diagrams of FIGS. 11 and 12, the tension pulleys 78, 81 are engaged with and fixed to the outer periphery of an outer race of the bearing 79. Respective side surfaces in cross section of the tension pulleys 78, 81 is parallel with the respective side surfaces of the pulley grooves 31, 36 of the variable speed pulleys 28, 33. Thus, respective inclining angles θ3 of the side surfaces of the tension pulleys 78, 81 are matched with respective angles in cross section of the pulley grooves 31, 36 and respective axial lengths of the outer peripheries of the tension pulleys 78, 81 are smaller than the width of the inner surface of the belt 38. The tension pulleys 78, 81 are made of fiber reinforced resin combined with polyamide fiber (e.g., 6,6-nylon resin combined with glass fiber of 30%), thereby reducing sounds generated when the V-belt 38 comes in contact with the blocks 40, 40 . . . .

Description is made next about operations of the above embodiment.

The vehicle engine E is connected to the first rotary shaft 2 of the continuous speed-shifting device A via the driven and driving pulleys 92, 91 and via the V-belt 93, and the output gear 22 as a pinion carrier for supporting the pinions 21, 21 . . . of the planetary gear mechanism 19 is connected to the driving wheels of the vehicle. Accordingly, the rotating power of the engine E is changed in speed by the continuous speed-shifting device A and then transmitted to the driving wheels. At this time when the speed-shifting device A is operated, the power inputted from the first rotary shaft 2 is transmitted to the variable speed pulley mechanism 27, the gear 5 on the first rotary shaft 2 and the planetary gear mechanism 19 and then is outputted as output power from the output gear 22 as a pinion carrier of the planetary gear mechanism 19, because the planetary gear mechanism 19 and the variable speed pulley mechanism 27 are arranged in parallel with each other on the power transmission channel located between the first rotary shaft 2 as an input part and the output gear 22 as an output part.

(Operation at the neutral state)

When the operating lever 66 is at the neutral position, the output gear 22 of the planetary gear mechanism 19 is deactivated in rotation and the continuous speed-shifting device A is in the neutral state. At this time, the rotating power of the engine E is not transmitted to the driving wheels and the vehicle is brought to a halt.

At the neutral state, the diameter at which the belt is wound around the first variable speed pulley 28 of the variable speed pulley mechanism 27 is, for example, 108 mm, the diameter at which the belt is wound around the second variable speed pulley 33 is, for example, 72 mm, the speed ratio between both the pulleys 28, 33 is a set value of 0.666, and both the first and second variable speed pulleys 28, 33 are positioned on the driving side or the driven side.

By the spring force of the tension spring 83 of the tension mechanism 73, the first and second tension arms 75, 76 are forced to rotate clockwise and counter-clockwise in FIG. 2, respectively. Accordingly, when the operating lever 66 is in the neutral position, the first tension pulley 78 presses the inner surface of the upper span 38a of the V-belt 38 in FIG. 2 and the second tension pulley 81 presses the inner surface of the lower span 38b by the same force as in the first tension pulley 78.

Further, when the operating lever 66 is shifted into the neutral position, this shift is detected by the limit switch 98 and the actuator 96 such as an air cylinder of the tension clutch 97 is operated by receiving the detection signal from the limit switch 98. Thus, the tension arm 95 is rotated, against the force by a spring or the like, in a direction opposite to the direction on which the tension pulley 94 presses the belt 93, so that the pressure on the slack side span of the V-belt 93 between the driving and driven pulleys 92, 91 is suspended, the power transmission between the engine E and the speed-shifting device A is interrupted and the speed-shifting device A is connected only to the driving wheel side.

In the variable speed pulley mechanism 27, the fixed sheaves 29, 34 of the variable speed pulleys 28, 34 are arranged so as to be in a reverse position to each other in an axial direction and the movable sheaves 30, 35 are also arranged so as to be in a reverse position to each other in an axial direction. At the neutral time, the linkage mechanism 64 connects both the cam mechanisms 47, 54 for moving the movable sheaves 30, 35 from their back sides so as to move them toward and away from the corresponding fixed sheaves 29, 34. Accordingly, both the variable speed pulleys 28, 33 are positioned on the driving side or the driven side, so that the tension of the belt 38 is distributed in a balanced manner between both the pulleys 28, 33 and thus the thrusts to the belt by both the pulleys 28, 33 are equal to each other.

At the neutral state, when a small change in rotation occurs on the normal rotating side or the reverse rotating side of the output gear 22 with respect to the first rotary shaft 2 due to the external load from the driving wheels so that the diameter at which the belt is wound around one of the first and second variable speed pulleys 28, 33 becomes larger than the diameter at which the belt is wound around the other, the tension of the belt 38 is distributed in an unbalanced manner between the pulleys 28, 33. Thus, the thrust to the belt 38 by the pulley 28 or 33 around which the belt 38 is wound at the larger diameter is increased than that of the other pulley 33 or 28, and the difference between the thrusts to the belt by the pulleys 28, 33 is increased as the external load increases. In this case, even if the continuous speed-shifting device A is slightly shifted from the real neutral state, the stability acts for changing the belt tension so as to reduce the increased diameter at which the belt is wound around the pulley 28 or 33 to automatically return to the neutral state. In this embodiment, the neutral zone part 68 for interrupting the transmission of the operating power of the operating lever 66 to the linkage mechanism 64 at the neutral state is provided on the operating power transmission channel extending from the operating lever 66 to the linkage mechanism 64. Accordingly, at the return to the neutral state, the pin member 69 of the neutral zone part 68 freely moves at the engagement part 70 so as not to prevent the return to the neutral state. As described above, the continuous speed-shifting device A itself has a self-lock function of returning to the neutral state. Accordingly, if only the power on the input side (engine E side) is interrupted by the tension clutch 97, the neutral state is stably maintained thereby preventing the vehicle from moving accidentally. This enhances the stopping stability of the vehicle at the neutral state.

Both the rotating levers 50, 57 of the cam mechanisms 47, 54 located on the variable speed pulley 28, 33 sides are connected to each other via the link 62. Accordingly, by changing the speed ratio of the variable speed pulley mechanism 27 by switching operation of the operating lever 66, the output gear 22 of the planetary gear mechanism 19, namely, the output part of the continuous speed-shifting device A, can be shifted into the normal rotating state or the reverse rotating state and its rotating speed can be increased.

(Operation at the forward state)

When the operating lever 66 is shifted from the neutral state to the forward state, the cam 56 rotates in one direction around the boss part 35a of the movable sheave 35 of the second variable speed pulley 33 while rotating the rollers 59, 59 on the cam surfaces 56a, 56a, respectively, under the construction that the operating lever 66 is connected to the rotating lever 57 on the outer periphery of the rotating cam 56 of the second cam mechanism 54. Thus, the cam surfaces 56a are pressed by the rollers 59 so that the cam 56 moves on the second rotary shaft 12 and then the movable sheave 35 axially movable with the cam 56 via the bearing 55 moves together with the cam 56 to approach the fixed sheave 34. As a result, the second variable speed pulley 33 is closed and the diameter at which the belt is wound around the second variable speed pulley 33 is increased from 72 mm at the neutral state to 120 mm at maximum. The increase of the diameter moves the V-belt 38 closer to the second variable speed pulley 33.

At the same time, due to the switching of the operating lever 66 to the forward position, the rotating cam 48 of the first cam mechanism 47 synchronizes with the movement of the movable sheave 35 of the second variable speed pulley 33 to rotate on the first rotary shaft 2 in the same direction as in the cam 56 of the second cam mechanism 54. By the rotation of the cam 48, the pressure on the roller 52 is lost. Thus, the cam 48 and the movable sheave 30 connected to the cam 48 via the bearing 49 move on the first rotary shaft 2 so as to move away from the fixed sheave 29 by the tension of the belt moving toward the second variable speed pulley 33. This opens the first variable speed pulley 28 to reduce the diameter at which the belt is wound around the first variable pulley 28 from 108 mm at the neutral state to 60 mm at minimum. As a result of this, the diameter at which the belt is wound around the second variable speed pulley 33 is larger than the diameter at which the belt is wound around the first variable speed pulley 28, and thus the rotation of the second rotary shaft 12 increased in speed and transmitted to the first rotary shaft 2. At the above speed ratio between the pulleys 28, 33, the output gear 22 as a pinion carrier rotates in a reverse rotational direction with respect to the first rotary shaft 2 and the driving wheels are rotated in the forward direction of the vehicle by the output power of the engine E. By changing the speed ratio to the forward highest speed position, the rotation speed in the normal rotation of the output gear 22, namely, the forward speed is increased.

At this time, the input power is transmitted in such a manner as to use as its driving power channel the channel reaching the output gear 22 via the gear 5 and the ring gear 23 of the planetary gear mechanism 19 and use as its circulation power channel the channel reaching the second rotary shaft 12 or the variable speed pulley mechanism 27 from the sun gear 20 of the planetary gear mechanism 19. In general, the use frequency at the forward state of the vehicle is higher than that at the backward state thereof. In this embodiment, the variable speed pulley mechanism 27 becomes the circulating power channel at the forward state, so that as a whole the circulating power smaller than the driving power is transmitted to the belt 38 with high use frequency over the long term. Accordingly, even if high power is transmitted at the forward state of which the use frequency is high, the transmission load of the belt 38 can be reduced.

Further, in the case that the variable speed pulley mechanism 27 becomes the circulating power channel, the second variable speed pulley 33 is a driving pulley while the first variable speed pulley 28 is a driven pulley, so that the upper span 38a of the V-belt 38 in FIG. 2 is a slack side span. Since both the tension arms 75, 76 are forced to rotate in a direction opposite to each other by the tension spring 83 in order that the first tension pulley 78 presses the upper span 38a of the V-belt 38 in FIG. 2 and the second tension pulley 81 presses the lower span 38b of the V-belt 38 in FIG. 2, the second tension pulley 81 pressing the inner surface of the tight side span 38b moves upward in FIG. 2 so that the second tension arm 76 rotates clockwise. Thus, the tension spring 83 is stretched and the first tension arm 75 is rotated clockwise by the amount which corresponds to the stretched length of the tension spring 83. As a result, the first tension pulley 78 presses the inner surface of the upper span 38a as a slack side span of the belt 38 at set pressure, thereby obtaining required belt tension.

In this embodiment, the torque cam mechanism 42 is disposed between the boss part 30a of the movable sheave 30 of the first variable speed pulley 28 and the pulley shaft part 4 of the first rotary shaft 2, and the forward side and backward side cam faces 45a, 45b are formed on both the side walls of each torque cam hole 45 of the torque cam mechanism 42, respectively. Thus, when the movable sheave 30 and the first rotary shaft 2 are relatively rotated by the transmission load of the variable speed pulley mechanism 27 at the forward state, the forward side cam face 45a of each torque cam hole 45 comes in contact with the torque ring 44 located at the tip end of the torque pin 43 so that the movable sheave 30 is pressed in an axial direction to move away from the fixed sheave 29. By the movement of the movable sheave 30, the movable sheave 35 of the second variable speed pulley 83 is pressed toward the fixed sheave 34 via the rotating cam 48 of the first cam mechanism 47, the linkage mechanism 64 and the rotating cam 56 of the second cam mechanism 54, thereby increasing the thrust to the belt 38 at the second variable speed pulley 33.

Both the tension arms 75, 76 are forced to rotate in a direction opposite to each other by the spring force of the tension spring 83 of the tension mechanism 73 so that the tension pulleys 78, 81 located at the tip end of the tension arms 75, 76 press the inner surfaces of the slack side spans 38a, 38b of the belt 38, respectively. By the pressing of the tension pulleys 78, 81, the belt 38 obtains its tension. However, since the belt tension is larger than the maximum tension generated at the slack side span 38a, 38b, the belt tension has a wedging effect of the belt 38 on the pulleys 28, 33 thereby generating a belt thrust. By the belt thrust, power is transmitted via the belt 38 between both the pulleys 28, 33.

(Operation at the backward state)

When the operating lever 66 is shifted into the forward position, the cam 48 of the first cam mechanism 47 rotates in another direction opposite to the cam 56 around the boss part 30a of the movable sheave 30 of the first variable speed pulley 28 while rotating the rollers 52 on the cam surfaces 48a. Thus, the cam surfaces 48a are pressed by the rollers 52 so that the cam 48 moves on the first rotary shaft 2 and then the movable sheave 30 axially movable with the cam 48 moves together with the cam 48 to approach the fixed sheave 29. As a result, the first variable speed pulley 28 is closed and the diameter at which the belt is wound around the first variable speed pulley 28 is increased from 108 mm at the neutral state to 120 mm at maximum. The increase of the diameter moves the V-belt 38 closer to the first variable speed pulley 28.

Due to the switching of the operating lever 66 to the backward position, the cam 56 of the second cam mechanism 54 rotates on the second rotary shaft 12 in the same direction as in the cam 48 of the first cam mechanism 47. By the rotation of the cam 56, the pressure on the rollers 59 is lost. Thus, the cam 56 and the movable sheave 35 connected to the cam 56 via the bearing 55 move on the second rotary shaft 12 so as to move away from the fixed sheave 34 by the tension of the belt 38 moving toward the first variable speed pulley 28. This opens the second variable speed pulley 33 to reduce the diameter at which the belt is wound around the second variable pulley 33 from 72 mm at the neutral state to 60 mm at minimum. As a result of this, the diameter at which the belt is wound around the first variable speed pulley 28 is larger than the diameter at which the belt is wound around the second variable speed pulley 33, and thus the rotation of the first rotary shaft 2 is increased in speed and transmitted to the second rotary shaft 12. At the above speed ratio between the pulleys 28, 33, the output gear 22 rotates in a normal rotational direction with respect to the first rotary shaft 2 and the driving wheels are rotated in the backward direction of the vehicle by the output power of the engine E. By changing the speed ratio to the backward highest speed position, the rotation speed in the reverse rotation of the output gear 22, namely, the backward speed is increased.

At this time, contrary to the forward state, the input power is transmitted in such a manner as to use as its driving power channel the channel reaching the sun gear 20 of the planetary gear mechanism 19 from the second rotary shaft 12 or the variable speed pulley mechanism 27 and use as its circulation power channel the channel reaching the first rotary shaft 2 from the output gear 22 as a pinion carrier of the planetary gear mechanism 19 via the pinions 21, 21, . . ., the ring gear 23 and the gear 5. When the variable speed pulley mechanism 27 becomes the driving power channel, durability of the V-belt 38 may be lowered due to great driving power acting on the V-belt 38. As described above, however, since the use frequency at the backward state of the vehicle is lower than that at the forward state thereof, high transmission load is applied to the V-belt 38 for a short time.

Accordingly, the durability of the belt 38 cannot be greatly lowered.

Further, at the backward state, the first variable speed pulley 28 is a driving pulley while the second variable speed pulley 33 is a driven pulley, so that the lower span 38b of the V-belt 38 in FIG. 2 is a slack side span. Since both the tension arms 75, 76 are forced to rotate in a direction opposite to each other by the tension spring 83 in the same manner as in the forward state, the first tension pulley 78 pressing the inner surface of the tight side span 38a moves downward in FIG. 2 so that the first tension arm 75 rotates counter-clockwise. By the spring force of the tension spring 83, the second tension arm 76 is also rotated counter-clockwise. As a result, the second tension pulley 81 presses the inner surface of the lower span 38b as a slack side span of the belt 38 at set pressure, thereby obtaining required belt tension.

At the backward state, when the movable sheave 30 of the first variable speed pulley 28 and the first rotary shaft 2 are relatively rotated by the transmission load of the variable speed pulley mechanism 27, the backward side cam face 45b of each torque cam hole 45 comes in contact with the torque ring 44 located at the tip end of the torque pin 43 so that the movable sheave 30 is pressed in an axial direction to move toward the fixed sheave 29. By the movement of the movable sheave 30, the thrust to the belt 38 at the first variable speed pulley 28 can be increased.

As described above, in this embodiment, since the gear ratio of the planetary gear mechanism 19 and the gear ratio with respect to the planetary gear mechanism 19 are set, at the forward state of which the use frequency is higher than that at the backward state, in order that the rotation speed of the ring gear 23 is always higher than that of the sun gear 20, the frequency with which the circulating power smaller than the driving power is transmitted to the belt 38 of the variable pulley mechanism 27 is increased and the frequency with which the larger driving power is transmitted to the belt 38 is reduced. Accordingly, the normal and reverse rotation of the continuous speed-shifting device A can be readily obtained without an individual normal and reverse rotation mechanism, reducing load to the belt 38.

The respective rotating cams 48, 56 of the cam mechanism 47, 54 are supported around the respective boss parts 30a, 35a of the movable sheaves 30, 35 of the variable speed pulleys 28, 33 of the variable speed pulley mechanism 27 via the respective bearings 49, 55, and both the rotating levers 50, 57 on the outer peripheries of the rotating cams 48, 56 are connected to each other via the link 62. Thus, at the speed shifting of the variable speed pulley mechanism 27, force acts on the cam faces 48a, 56a of the rotating cams 48, 56 from the rollers 52, 59 supported to the fixed cams 51, 58 in a direction at right angles to the cam faces 48a, 56a. When a rectangular component of the force which is orthogonal to the rotary shafts 2, 12 acts at a right angle to respective lines connecting the respective axes of the rotary shafts 2, 12 and respective connection points to the link 62, there is generated counter force for rotating the cams which is at a right angle to the respective lines connecting the respective axes of the rotary shafts 2, 12 and the respective connection points to the link 62 in spite of the variation of the speed ratio and which is in a direction opposite to the rectangular component of the force. The counter force acts so as to press the boss parts 30a, 35a of the movable sheaves 30, 35 supporting the rotating cams 48, 56. In detail, the counter force acting on the boss parts 30a, 35a acts, at a clearance existing at the place where the boss parts 30a, 35a slides on the rotary shafts 2, 12, so that there is generated the moment in a direction reverse to the moment acting so as to incline the movable sheaves 30, 35 toward the rotary shafts 2, 12 when the movable sheaves 30, 35 receive the thrust from the belt 38. The moment cancels the original moment to reduce it so that the surface pressure of the inner peripheries of the boss parts 30a, 35a to the outer peripheries of the rotary shafts 2, 12 is dispersed in an axial direction of the rotary shafts 2, 12, thereby reducing the resistance against the sliding of the boss parts 30a, 35a. By the amount that the resistance against the sliding is reduced, the load which the rotating cams 48, 56 transmits to fixed points of the rollers 52, 59 from the belt thrust generated at the belt, namely, a drawn thrust from the belt thrust, increases. In other words, the belt thrust generated at the belt is transmitted as the drawn thrust to the rotating cams 48, 56 without great resistance. Since the load (operating force) required for the shifting operation at the change of the speed ratio is equal to the difference between the belt thrust generated at the belt and the drawn thrust, the operating force is smaller as the drawn thrust increases. Accordingly, due to the balance between the thrusts to the belt by both the variable speed pulleys 28, 33 of the variable speed pulley mechanism 27, the resistance is reduced at the transition to the neutral state and the continuous speed-shifting device A is adjusted smoothly to the neutral state. Thus, the neutral state can be maintained in stabler condition.

Both the tension arms 75, 76 are forced to rotate in a direction reverse to each other by the tension spring 83 in order that the first tension pulley 78 presses the upper span 38a of the V-belt 38 in FIG. 2 and that the second tension pulley 81 presses the lower span 38b of the V-belt 38, and the pressing force to the slack side span 38a or 38b of the belt 38 is obtained by the return of the tight side span 38b or 38a of the belt 38. Accordingly, even if the slack side span and the tight side span are switched at the switching between the forward and backward states, the slack side span can be automatically pressed while maintaining a set distance between both the tension pulleys 78, 81. This presents stable belt tension.

Further, since the tension arms 75, 76 are forced to rotate by the tension spring 83, buckling as in the case of a compression spring does not generate and appropriate spring constant can be obtained. This advantageously acts on the stabilization of the belt tension. Instead of this embodiment in which the inner surfaces of both the spans 38a, 38b of the belt 38 are pressed by the tension pulleys 78, 81, respectively, there may be composed that a pair of tension pulleys are arranged so as to press the backs of the spans 38a, 38b of the belt 38 respectively and that respective tension arms supporting the respective tension pulleys are forced to rotate in a direction of pressing the belt by a tension spring.

Respective axial lengths of the outer peripheries of the tension pulleys 78, 81 is shorter than the width of the inner surface of the belt 38, and both the tension pulleys 78, 81 are arranged between both the spans 38a, 38b of the belt 38 so as to press the inner surfaces of the spans 38a, 38b to generate the belt thrust. Accordingly, the tension pulleys 78, can be arranged with the use of a dead space between both the spans 38a, 38b, thereby compacting the continuous speed-shifting device A. Further, since the respective inclining angles θ3 of the side surfaces of the tension pulleys 78, 81 are matched with respective angles in cross section of the pulley grooves 31, 36, the tension pulleys 78, 81 do not interfere with the side surfaces of the pulley grooves 31, 36 of the variable speed pulleys 28, 33 when moving into the pulley grooves 31, 36. Accordingly, while the bending ratios of the spans 38a, 38b of the belt 38 with the use of tension pulleys having larger diameters, the distance between both the rotary shafts 2, 12 can be shortened thereby compacting both the rotary shafts 2, 12 of the continuous speed-shifting device A in an axial direction.

Respective tension pulleys 78, 81 are so positioned that the outer peripheries thereof always comes in contact with portions of the inner surface of the belt 38 and press them in spite of the axial movement of the belt 38 at the speed shifting. Accordingly, even if the widths of the tension pulleys 78, 81 are smaller than the width of the inner surface of the belt 38 and the belt 38 moves in an axial direction along with the side faces on the fixed pulleys 29, 34 side of the pulley grooves 31, 36 with changing the diameters at which the belt is wound around the variable speed pulleys 28, 33 by the opening and closing of the variable speed pulleys 28, 33, the tension pulleys 78, 81 are not detached in an axial direction from the belt 38 and therefore the case where the tension pulleys 78, 81 cannot press the slack side spans 38a, 38b does not occur. Thus, the belt 38 can be stably pressed.

The tension pulleys 78, 81 are made of fiber reinforced resin combined with polyamide fiber. Accordingly, abrasion of the V-belt 38 due to the contact with the tension pulleys 78, 81 can be reduced. Further, even if the belt 38 is a block belt in which the inner surface has concavities and convexities due to the blocks 40, 40, . . ., beating sounds when the blocks 40 intermittently come in contact with the tension pulleys 78, 81 can be reduced thereby reducing the operating sound of the continuous speed-shifting device A.

Since the boss part 30a of the movable sheave 30 of the first variable speed pulley 28 receives high surface pressure from the torque cam mechanism 42, the boss part 30a is not cast but forged. The boss part 30a is integrally formed with the sheave body 30b. Accordingly, as compared with the case that the boss part 30a and the sheave body 30b are individually formed and then they are integrated by soldering, distortion due to soldering is eliminated thereby enhancing the precision of the circularity of the movable sheave 30, and vibration of the V-belt 38 to which transmission is carried out at high load is reduced thereby restricting the abrasion of the belt. This enhances the reliability of the continuous speed-shifting device A.

Since the torque cam mechanism 42 is disposed between the boss part 30a of the movable sheave 30 of the first variable speed pulley 28 and the pulley shaft part 4 of the first rotary shaft 2 and the forward and backward side cam faces 45a, 45b are formed at each torque cam hole 45 of the torque cam mechanism 42, the movable sheaves 30, 35 are axially moved by the torque cam mechanism 42 not only at the forward state of the vehicle but also at the backward state thereof, thereby increasing the thrust to the belt.

At the forward state, the variable speed pulley mechanism 27 is at a low speed state where the diameter at which the belt is wound around the first variable speed pulley 28 is smaller than the diameter at which the belt is wound around the second variable speed pulley 33, so that the thrust difference between the thrust to the belt on the driving pulley side and the thrust to the belt on the driven pulley side are increased. On the other hand, at the backward state, the variable speed pulley mechanism 27 is at a high speed state so that the above thrust difference are decreased. However, since the lead angle $\theta_1$ of the forward side cam face 45a of each torque cam hole 45 is set larger than the lead angle $\theta_2$ of the backward side cam face 45b, an appropriate thrust to the belt can be obtained in accordance with characteristics of the thrust differences at the forward and backward states.

In addition, the torque pin 43 of the torque cam mechanism 42 passes through the pulley shaft part 4 of the second rotary shaft 12 in a radial direction of the shaft 12 and is supported to the second rotary shaft 12, and the torque ring 44 is supported to the protruding portions at both the tip ends of the torque pin 43. Accordingly, the torque pin 43 can enhance its verticality thereby preventing the torque ring 44 from coming in contact with only one of the cam faces 45a, 45b of the torque cam hole 45.

Since the pinions 21, 21, . . . of the planetary gear mechanism 19 are supported to the output gear 22 and the output gear 22 is connected to the driving wheels, the output gear 22 also serves as a pinion carrier thereby reducing the number of parts. Further, as compared with the case that the pinion carrier as an output part is connected to the driving wheel side on the second rotary shaft 12, the length of the second rotary shaft 12 can be reduced thereby compacting the continuous speed-shifting device A in the axial direction.

The casing 1 of the continuous speed-shifting device A is divided into the first, second and third divisional casings 1a, 1b, 1c, the first rotary shaft 2 is axially divided into the gear shaft part 3 located between the first and second divisional casings 1a, 1b and the pulley shaft part 4 located between the second and third divisional casings 1b, 1c, the second rotary shaft 12 is axially divided into the gear shaft part 13 located between the first and second divisional casings 1a, 1b and the pulley shaft part 14 located between the second and third divisional casings 1b, 1c, the gear 5 and the planetary gear mechanism 19 are disposed around the gear shaft parts 3, 13, respectively, and the variable speed pulley mechanism 27 is disposed around the pulley shaft parts 4, 14. Thus, the continuous speed-shifting device A can be divided into two units of the arrangement part of the variable speed pulley mechanism 27 and the arrangement part of the planetary gear mechanism 19. Accordingly, when check and repair of the belt 38 of the variable speed pulley mechanism 27 or replacement of parts of the planetary gear mechanism 19 is carried out, only the necessary unit can be removed and disassembled with the rest left as it is. This facilitates the maintenance and replacement of parts.

On the variable speed pulley mechanism 27 side of the first rotary shaft 2, the sleeve 8 and the bush 9 are engaged with the outer periphery of the small diameter part of the pulley shaft part 4 on the gear shaft part 3 side and the opposite side thereof, respectively, the fixed sheave 29 of the first variable speed pulley 28 is supported on the sleeve 8, and the bush 9 is supported to the third divisional casing 1c via the bearing 10. Thus, the sleeve 8 supporting the fixed sheave 29 is placed away from the bush 9 for supporting the bearing 10. Accordingly, when axial load is applied to the fixed sheave 29 from the V-belt 38, the fixed sheave 29 can be prevented from inclining inward with the position of the bearing 10 being made a fulcrum, that is, from inclining so that the outer peripheral edge of the sheave 29 moves toward the pulley groove 31, unlike the case that the continuous speed-shifting device cannot be divided. Thereby, local abrasion of the belt 38 and the fixed sheave 29 can be prevented.

Furthermore, as shown in FIG. 3, the sleeve 8 is engaged with the outer periphery of the pulley shaft part 4 where the torque pin 43 of the torque cam mechanism 42 is attached, and both the fixed and movable sheaves 29, 30 of the first variable speed pulley 28 are engaged with and supported around the sleeve 8. Thus, unlike the case that the fixed sheave 29 is directly key-connected to the pulley shaft part 4, failure of the relative rotation between the movable sheave 80 and the pulley shaft part 4 of the first rotary shaft 2 due to the force acting from the belt 38 on the fixed and movable sheaves 29, 30 does not occur. Accordingly, the relative rotation between the movable sheave 30 and the pulley shaft part 4 of the first rotary shaft 2 can be realized while obtaining the thrust to the belt at both the sheaves 29, 80. Thereby, the operation of the torque cam mechanism 42 can be secured in good condition.

Since the torque cam mechanism 42 is provided on the first variable speed pulley 28 side which is a driven side with respect to the circulating power at the forward state of the continuous speed-shifting device A, a necessary thrust to the belt according to the speed ratio can be readily obtained even if the lead angle θ1 of the forward side cam face 45a of the torque cam hole 45 is uniform.

The cylindrical collar is engaged with the outer periphery of the boss part 30a of the movable sheave 30 of the first variable speed pulley 28 so as to cover the torque cam holes 45 and the rotating cam 48 of the first cam mechanism 47 is supported on the cylindrical collar via the bearing 49. Accordingly, the torque cam holes 45 of the torque cam mechanism 42 can be sealed up with the collar, thereby effectively preventing lubricating oil filled in the torque cam holes 45 from scattering to the outside.

In the above embodiment, the ring gear 23 of the planetary gear mechanism 19 is connected to the first rotary shaft 2. However, the gear 22 as a pinion carrier may be connected to the first rotary shaft 2 while the ring gear 23 serves as an output gear. In another application, the sun gear 20 may serve as the output part. After all, one of the sun gear 20, the pinion carrier and the ring gear 23 in the planetary gear mechanism 20 is connected to the first rotary shaft 2, one of the rest is connected to the second rotary shaft 12 and the rest serves as the output part.

Further, the continuous speed-shifting device A can be composed so that the pinion carrier of the planetary gear mechanism 19 serves as an input part of power and the first rotary shaft 2 serves as an output part thereof.

In the above embodiment, the circulating power is transmitted to the variable speed pulley mechanism 27 at the forward state of the vehicle. However, in the case that the use frequency at the backward state of the vehicle is higher than that at the forward state, the circulating power may be operated on the belt 38 at the backward state.

We claim:

1. A continuous speed-shifting device comprising:

first and second rotary shafts arranged in parallel with each other;

a variable speed pulley mechanism having a pair of variable speed pulleys in which a fixed sheave and a movable sheave are supported on respective outer peripheries of the rotary shafts so as to be opposed to each other, a belt wound between both the variable speed pulleys, a pair of driving mechanisms each of which is disposed on the back side of the movable sheave of each variable speed pulley and varies a diameter at which the belt is wound around the variable speed pulley by moving the movable sheave toward and away from the fixed sheave, a linkage mechanism for varying a speed ratio between both the variable speed pulleys by linking both the driving mechanisms to each other so as to vary the diameters at which the belt is wound around both the variable speed pulleys in a direction opposite to each other, a switching operation part for operating the linkage mechanism, and a tension mechanism for pressing a slack side span of the belt between both the variable speed pulleys so as to generate a tension larger than that generating in accordance with the speed ratio between the variable speed pulleys thereby generating a belt thrust; and a differential gear mechanism which has first, second and third gear elements connected to one another and in which the first gear element is connected to the first rotary shaft and the second gear element is connected to the second rotary shaft, wherein one of the first rotary shaft and the third gear element is an input part while the other is an output part, the output part is shifted in speed in such a manner as to be switched into a normal rotating state, a neutral state or a reverse rotating state with respect to the input part by switching operation of the switching operation part, the output part is forced so as to be shifted into the neutral state by a balance between the thrusts to the belt by both the variable speed pulleys of the variable speed pulley mechanism, and in higher use frequency one of the normal rotating state and the reverse rotating state, at least one of a gear ratio of the differential gear mechanism and a gear ratio between the differential gear mechanism and a gear element meshed with the differential gear mechanism are set in order that the rotation speed of the first gear element is always higher than the rotation speed of the second gear element.

2. A continuous speed-shifting device according to claim 1, wherein the variable speed pulley mechanism is so composed that the movable sheave and the fixed sheave are oriented in reverse between both the variable speed pulleys, the driving mechanism is a cam mechanism which has a cylindrical rotating cam rotatably supported on a boss part of the movable sheave of the variable speed pulley via a bearing and a fixed cam in contact with the rotating cam, and in which one of the rotating cam and the fixed cam has a cam face formed at a surface thereof while the other is formed into a cam follower to be in contact with the cam face and the movable sheave is moved in an axial direction by relative rotation of the rotating and fixed cams, and the linkage mechanism has a link for connecting the rotating cams of both the cam mechanisms to each other.

3. A continuous speed-shifting device according to claim 1, wherein the input part is connected to an engine mounted in the vehicle while the output part is connected to driving wheels of the vehicle, and the forward state in which the driving wheels are rotated so as to move forward the vehicle is higher in use frequency.

4. A continuous speed-shifting device according to claim 1, further comprising a torque cam mechanism which has (a) a cam part formed at the boss part of the movable sheave of one of the variable speed pulleys and having a cam face and (b) a torque pin which protrudes from the outer periphery of the rotary shaft and makes contact with the cam face of the cam part by relative rotation of the movable sheave with respect to the rotary shaft to move the movable sheave in an axial direction, wherein the boss part of the movable sheave at which the torque cam mechanism is provided is integrally formed with the body part of the movable sheave.

5. A continuous speed-shifting device according to claim 4, wherein the torque pin of the torque cam mechanism is composed of a pin member passing through the rotary shaft in its radial direction and supported to the rotary shaft.

6. A continuous speed-shifting device according to claim 4, wherein the cam face of the torque cam mechanism is formed at each of opposing side faces of the cam part so that the cam faces accord with the normal and reverse rotating states of the output part with respect to the input part, respectively.

7. A continuous speed-shifting device according to claim 4, wherein the torque cam mechanism is provided at the variable speed pulley which becomes a driven side when the variable speed pulley mechanism becomes a circulating power channel.

8. A continuous speed-shifting device according to claim 6, wherein the opposing cam faces of the cam part are different in lead angle from each other.

9. A continuous speed-shifting device according to claim 1, wherein the differential gear mechanism is composed of a planetary gear mechanism having (a) a sun gear provided on the second rotary shaft, (b) at least one pinion meshed with the sun gear, (c) a ring gear meshed with the pinion, and (d) a transmission gear provided on the second rotary shaft and directly connected to the pinion.

10. A continuous speed-shifting device according to claim 9, wherein the sun gear of the planetary gear mechanism is fixed to the second rotary shaft so as to rotate together with the second rotary shaft, the ring gear has inner teeth meshed with the pinion and outer teeth connected to the first rotary shaft, and the transmission gear is provided rotatably on the second rotary shaft in the vicinity of the sun gear and the pinion and a hub part of thereof is connected to a supporting pin of the pinion thereby forming the transmission gear into an output gear.

11. A continuous speed-shifting device according to claim 1, wherein each of the first and second rotary shafts is composed of:

a gear shaft part rotatably supported to a casing and connected to the differential gear mechanism; and a pulley shaft part which is rotatably supported to the casing, supports the variable speed pulley, is located coaxially with the gear shaft part and is removably connected to the gear shaft part.

12. A continuous speed-shifting device according to claim 1, wherein the casing supporting the first and second rotary shafts is composed of:

a first casing part which covers the side on which the differential gear mechanism is disposed and rotatably supports the end parts of the first and second rotary shafts on the differential gear mechanism side;

a second casing part which covers the outer periphery of the differential gear mechanism and in which openings are formed at both sides thereof respectively and one of the openings is adjacent to an opening of the first casing part; and a third casing part which is adjacent to the other opening side of the second casing part, covers the outer periphery of the variable speed pulley mechanism and the side on which the variable speed pulley mechanism is disposed and rotatably supports the end parts of the first and second rotary shafts on the variable speed pulley mechanism side.

13. A continuous speed-shifting device according to claim 11, wherein the casing is composed of:

a first casing part which covers the side on which the differential gear mechanism is disposed and rotatably supports the end parts of the first and second rotary shafts on the differential gear mechanism side;

a second casing part which covers the outer periphery of the differential gear mechanism and rotatably supports the intermediate parts of the first and second rotary shafts and in which openings are formed at both sides thereof and one of the openings is adjacent to an opening of the first casing part; and a third casing part which is adjacent to the other opening side of the second casing part, covers the outer periphery of the variable speed pulley mechanism and the side on which the variable speed pulley mechanism is disposed and rotatably supports the end parts of the first and second rotary shafts on the variable speed pulley mechanism side.

14. A continuous speed-shifting device according to claim 1, wherein the tension mechanism has a tension pulley which is disposed between both the spans of the belt wound between both the variable speed pulleys for pressing the inner faces of the spans.

15. A continuous speed-shifting device according to claim 1, wherein the tension mechanism comprises:

first and second tension arms each of which is pivotally supported to an axis parallel with the axes of the first and second rotary shafts;

first and second tension pulleys disposed on the inner face side of the belt and supported to the first and second tension arms respectively so as to rotate around respective axes parallel with the axes of the first and second rotary shafts; and forcing means which is interposed between the first and second tension arms and forces the first and second tension pulleys so as to move them away from each other thereby pressing the first tension pulley on the inner face of one span of the belt and pressing the second tension pulley on the inner face of the other span thereof.

16. A continuous speed-shifting device according to claim 15, wherein an attaching arm part is integrally provided on the second tension arm so as to rotate together with the second tension arm, and the forcing means is a tension spring interposed between the attaching arm part of the second tension arm and the first tension arm and rotating the attaching arm part and the first tension arm in a direction in which the angle therebetween becomes smaller thereby forcing the first and second tension pulleys in a direction in which they are moved away from each other.

17. A continuous speed-shifting device according to claim 16, wherein the first and second tension arms are pivotally provided around the axis of one of the first and second rotary shafts, the attaching arm part extends in a direction at approximately right angles to the body of the second tension arm, and the tension spring is disposed approximately along with a connection line between the first and second rotary shafts.

* * * * *